US012562382B2

(12) United States Patent
Oshita et al.

(10) Patent No.: US 12,562,382 B2
(45) Date of Patent: Feb. 24, 2026

(54) NICKEL MANGANESE COBALT COMPOSITE HYDROXIDE, METHOD FOR PRODUCING NICKEL MANGANESE COBALT COMPOSITE HYDROXIDE, LITHIUM NICKEL MANGANESE COBALT COMPOSITE OXIDE, AND LITHIUM ION SECONDARY BATTERY

(71) Applicant: SUMITOMO METAL MINING CO., LTD., Tokyo (JP)

(72) Inventors: Hiroko Oshita, Ehime (JP); Kazuomi Ryoshi, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 1085 days.

(21) Appl. No.: 17/424,949

(22) PCT Filed: Dec. 26, 2019

(86) PCT No.: PCT/JP2019/051175
§ 371 (c)(1),
(2) Date: Jul. 22, 2021

(87) PCT Pub. No.: WO2020/153093
PCT Pub. Date: Jul. 30, 2020

(65) Prior Publication Data
US 2022/0102718 A1    Mar. 31, 2022

(30) Foreign Application Priority Data

Jan. 22, 2019    (WO) ................. PCT/JP2019/001794
Apr. 16, 2019    (WO) ................. PCT/JP2019/016266

(51) Int. Cl.
H01M 4/1391    (2010.01)
H01M 4/131    (2010.01)
(Continued)

(52) U.S. Cl.
CPC ........... *H01M 4/525* (2013.01); *H01M 4/131* (2013.01); *H01M 4/1391* (2013.01); (Continued)

(58) Field of Classification Search
CPC .... H01M 4/525; H01M 4/131; H01M 4/1391; H01M 10/0525; H01M 2004/021; H01M 2004/028
See application file for complete search history.

(56) References Cited

U.S. PATENT DOCUMENTS

| 2006/0083989 A1* | 4/2006 | Suhara | ............... | C01G 45/1228 |
| | | | | 429/231.95 |
| 2009/0226811 A1* | 9/2009 | Nakaoka | ................ | C01G 51/50 |
| | | | | 429/231.95 |

(Continued)

FOREIGN PATENT DOCUMENTS

| CN | 103915615 A | 7/2014 |
| JP | 4915488 B1 | 4/2012 |

(Continued)

OTHER PUBLICATIONS

Mar. 24, 2020 International Search Report issued in International Patent Application No. PCT/JP2019/051175.
Feb. 14, 2023 Search Report issued in European Patent Application No. 19911414.1.

*Primary Examiner* — Alexander Usyatinsky
(74) *Attorney, Agent, or Firm* — Oliff PLC

(57) ABSTRACT

A nickel manganese cobalt composite hydroxide, which is a precursor of positive electrode active material, and composed of secondary particles wherein primary particles containing nickel, manganese, and cobalt are aggregated, or composed of primary and secondary particles, wherein sodium content contained in nickel manganese cobalt composite hydroxide is less than 0.0005% by mass, and void ratio of particles of nickel manganese cobalt composite (Continued)

S-4700 1.0kV 6.1mm ×10.0k SE(U,-50) 2016/06/23    5.00um hydroxide is 20% to 50%. Also, ratio of average particle size of lithium nickel manganese cobalt composite oxide divided by average particle size of nickel manganese cobalt composite hydroxide, which is a precursor, is 0.95 to 1.05, and further, when observing 100 or more particles of lithium nickel manganese cobalt composite oxide selected randomly by scanning electron microscope, number that aggregation of secondary particles is observed is 5% or less with respect to total number of observed secondary particles.

11 Claims, 1 Drawing Sheet

(51) Int. Cl.
*H01M 4/525*        (2010.01)
*H01M 10/0525*        (2010.01)
*H01M 4/02*        (2006.01)

(52) U.S. Cl.
CPC .................. *H01M 10/0525* (2013.01); *H01M 2004/021* (2013.01); *H01M 2004/028* (2013.01)

(56)        References Cited

U.S. PATENT DOCUMENTS

| | | | |
|---|---|---|---|
| 2014/0011090 A1* | 1/2014 | Toya | C30B 7/14 |
| | | | 429/223 |
| 2014/0087262 A1 | 3/2014 | Mahashi et al. | |
| 2017/0110726 A1* | 4/2017 | Aida | C01G 53/006 |
| 2017/0352884 A1* | 12/2017 | Saruwatari | H01M 4/525 |
| 2018/0347069 A1* | 12/2018 | Toya | H01M 4/505 |
| 2019/0341610 A1 | 11/2019 | Aida et al. | |

FOREIGN PATENT DOCUMENTS

| | | | | |
|---|---|---|---|---|
| JP | 2012-230898 A | 11/2012 | | |
| JP | 2015-122269 A | 7/2015 | | |
| JP | 2015-191844 A | 11/2015 | | |
| JP | 2015-191847 A | 11/2015 | | |
| JP | 2015-191848 A | 11/2015 | | |
| JP | 2016-117625 A | 6/2016 | | |
| JP | 2016-162601 A | 9/2016 | | |
| JP | 2019-106238 A | 6/2019 | | |
| WO | WO-2012020768 A1 * | 2/2012 | .......... | C01G 53/006 |
| WO | 2015/146598 A1 | 10/2015 | | |
| WO | 2016/013674 A1 | 1/2016 | | |

* cited by examiner

S-4700 1.0kV 6.1mm ×10.0k SE(U,-50) 2016/06/23  5.00um

NICKEL MANGANESE COBALT COMPOSITE HYDROXIDE, METHOD FOR PRODUCING NICKEL MANGANESE COBALT COMPOSITE HYDROXIDE, LITHIUM NICKEL MANGANESE COBALT COMPOSITE OXIDE, AND LITHIUM ION SECONDARY BATTERY

BACKGROUND OF THE INVENTION

Field of the Invention

The present invention relates to a nickel manganese cobalt composite hydroxide, which is a precursor of a positive electrode active material, and which is composed of secondary particles to which primary particles containing a nickel, a manganese, and a cobalt are aggregated, or composed of the primary particles and the secondary particles, a method for producing the nickel manganese cobalt composite hydroxide, a lithium nickel manganese cobalt composite oxide, and a lithium ion secondary battery. This application is based upon and claims the benefit of priority from International Patent Application No. PCT/JP2019/001794 filed on Jan. 22, 2019, and International Patent Application No. PCT/JP2019/016266 filed on Apr. 16, 2019.

Description of Related Art

In recent years, needs for a development of high-power secondary batteries as batteries for electric cars and hybrid cars are expanding, including compact and lightweight non-aqueous electrolyte secondary batteries having a high energy density, due to the widespread use of portable electronic devices such as smart phones, tablet terminals and notebook computers.

As a secondary battery which can cope with such needs, there is a lithium ion secondary battery. A lithium ion secondary battery includes a negative electrode, a positive electrode, and an electrolyte solution, and uses materials that can de-insert and insert lithium as a negative electrode active material and a positive electrode active material. Lithium ion secondary batteries are now actively being researched and developed. Particularly, lithium ion secondary batteries using a layered or spinel-type lithium metal composite oxide as a positive electrode material can provide a 4 V-class high voltage, and are therefore practically used as batteries having a high energy density.

Among them, a lithium nickel manganese cobalt composite oxide is attracting an attention as a material which can obtain high output with low resistance and has excellent cycle characteristic of battery capacity, and in recent years, it is considered to be important as a power supply for cars, as it is suitable for a power supply for electric cars and hybrid cars, in which a vehicle loading space is restricted. Generally, a lithium nickel manganese cobalt composite oxide is produced by a process to mix and fire a nickel manganese cobalt composite hydroxide, which is a precursor, with a lithium compound.

In this nickel manganese cobalt composite hydroxide, impurities such as a sulfate radical, a chloride radical, a sodium and the like, derived from a medicament or raw materials used in a production process, are included. In a process to mix and fire a nickel manganese cobalt composite hydroxide with a lithium compound, these impurities deteriorate a reaction with a lithium by inducing a side reaction and the like, so a crystallinity of a lithium nickel manganese cobalt composite oxide in a layered structure will be decreased.

In a lithium nickel manganese cobalt composite oxide with a crystallinity decreased by an effect of impurities, a battery capacity will be decreased as a diffusion of a lithium in a solid phase is inhibited, when composing a battery as a positive electrode active material. Also, these impurities almost do not contribute to charge and discharge reactions, so in a structure of a battery, for an amount corresponding to an irreversible capacity of a positive electrode material, a negative electrode material must be used in a battery excessively. As a result, a capacity per volume or per weight as an entire battery will be decreased, and an excessive lithium will be accumulated at a negative electrode as an irreversible capacity, so it will be a problem also from a safety aspect.

Further, a potassium, a calcium, a magnesium and the like, including a sodium dissolve to a lithium site, so particles of a lithium nickel manganese cobalt composite oxide tend to aggregate by sintering, and in a lithium ion secondary battery produced by using this lithium nickel manganese cobalt composite oxide, a reactivity will be deteriorated, and an output characteristic and a battery capacity will be decreased.

As impurities, there are a sulfate radical, a chloride radical, a sodium and the like, and technologies for removing these impurities have been disclosed so far.

For example, in a patent literature 1, it is disclosed to decrease a sulfate radical or a chloride radical by performing a crystallization process for obtaining a niobium-containing transition metal composite hydroxide, and by washing the obtained niobium-containing transition metal composite hydroxide with a carbonate aqueous solution such as a potassium carbonate, a sodium carbonate, and an ammonium carbonate.

Also, in a patent literature 2, it is disclosed to decrease impurities such as a sulfate radical, a chloride radical, and a carbonate radical by making an alkaline solution to be used for adjustment of pH into a mixed solution of an alkali metal hydroxide and a carbonate in a process for producing a nickel manganese cobalt composite hydroxide from a crystallization reaction.

Also, in a patent literature 3 and a patent literature 4, it is disclosed to decrease a sulfate radical or a chloride radical and sodium by washing nickel manganese composite hydroxide particles or nickel composite hydroxide particles having a void structure inside the particles obtained in the crystallization process by a carbonate aqueous solution such as a potassium carbonate, a sodium carbonate, a potassium hydrogen carbonate, and a sodium hydrogen carbonate.

Also, in a patent literature 5, it is disclosed to use a nickel-cobalt-M element-containing composite compound with low content of impurities such as a sulfate radical, a chloride radical, sodium, and iron, by pyrolyzing a nickel ammine complex and a cobalt ammine complex by heating the nickel-cobalt-M element-containing aqueous solution or aqueous dispersion obtained by mixing the nickel ammine complex, the cobalt ammine complex and M element source.

Patent Literature 1: JP 2015-122269 A
Patent Literature 2: JP 2016-117625 A
Patent Literature 3: WO2015/146598
Patent Literature 4: JP 2015-191848 A
Patent Literature 5: WO2012/020768

SUMMARY OF THE INVENTION

However, regarding the patent literatures 1 and 2, it is not disclosed about a removal of sodium at all. In addition, regarding the patent literature 3 and 4, a reduction of sodium is insufficient as 0.001% to 0.015% by mass of sodium still remains, even in a precursor of a solid level with a low void ratio of 2% to 4%. Further, regarding the patent literature 5, it is questioned that a battery characteristic will be sufficient when used as a positive electrode active material, from a point of view of a specific surface area, a particle size distribution, and a spherical shape of particles, as a nickel-cobalt-M element-containing composite compound is obtained by a pyrolysis. In addition, not only a removal of impurities, but also a further improvement of a battery characteristic with a high void ratio, and an inhibition of an aggregation by sintering are expected.

Here, a purpose of the present invention is to provide a nickel manganese cobalt composite hydroxide, which is a precursor of a positive electrode active material of a lithium ion secondary battery capable of further improving a battery characteristic with a high void ratio, and also capable of surely decreasing a sodium content especially, among impurities which almost do not contribute to charge and discharge reactions, and a method for producing the nickel manganese cobalt composite hydroxide. In addition, a purpose of the present invention is to provide a lithium nickel manganese cobalt composite oxide, which is a positive electrode active material, in which an aggregation by sintering is inhibited, and which is produced by using the nickel manganese cobalt composite hydroxide, in which a sodium content is surely decreased, and a lithium ion secondary battery.

A nickel manganese cobalt composite hydroxide relating to one embodiment of the present invention is a nickel manganese cobalt composite hydroxide, which is a precursor of a positive electrode active material, and which is composed of secondary particles to which primary particles containing a nickel, a manganese, and a cobalt are aggregated, or composed of the primary particles and the secondary particles, wherein a sodium content contained in the nickel manganese cobalt composite hydroxide is less than 0.0005% by mass, and a void ratio of particles of the nickel manganese cobalt composite hydroxide is 20% to 50%.

In this way, it is possible to provide a nickel manganese cobalt composite hydroxide, which is a precursor of a positive electrode active material of a lithium ion secondary battery capable of further improving a battery characteristic with a high void ratio, and capable of surely decreasing a sodium content.

Here, in one embodiment of the present invention, a specific surface area of the nickel manganese cobalt composite hydroxide may be 30 to 40 $m^2/g$.

In this way, by configuring its specific surface area to be large, it is possible to provide a nickel manganese cobalt composite hydroxide, which is a precursor of a positive electrode active material capable of obtaining a lithium ion secondary battery capable of further improving a battery characteristic.

Here, in one embodiment of the present invention, a sulfate radical content contained in the nickel manganese cobalt composite hydroxide may be 0.2% by mass or less, and also, a chloride radical content may be 0.01% by mass or less.

In this way, it is possible to provide a nickel manganese cobalt composite hydroxide, which is a precursor of a positive electrode active material of a lithium ion secondary battery capable of further improving a battery characteristic, and capable of surely decreasing a content of a sulfate radical, a chloride radical, and a sodium.

Here, in one embodiment of the present invention, a value of [(d90−d10)/average particle size], which is an index indicating a spread of a particle size distribution of the nickel manganese cobalt composite hydroxide, may be 0.55 or less.

In this way, a proportion of large particles and fine particles when formed as a positive electrode active material will be low, so in a lithium ion secondary battery using this positive electrode active material as a positive electrode, it is possible to obtain excellent cycle characteristic and battery output with an excellent safety.

Here, in one embodiment of the present invention, the nickel manganese cobalt composite hydroxide may be represented by a general formula: $Ni_xMn_yCo_zM_t(OH)_{2+a}$ (wherein x+y+z+t=1, $0.20 \leq x \leq 0.80$, $0.10 \leq y \leq 0.90$, $0.10 \leq z \leq 0.50$, $0 \leq t \leq 0.10$, $0 \leq a \leq 0.5$, and M is at least one selected from Mg, Ca, Al, Ti, V, Cr, Zr, Nb, Mo, and W).

In this way, it is possible to provide a nickel manganese cobalt composite hydroxide, which is a precursor of a positive electrode active material of a lithium ion secondary battery capable of further improving a battery characteristic with a high void ratio, and also, capable of surely decreasing a sodium content of the nickel manganese cobalt composite hydroxide.

Here, in one embodiment of the present invention, a content of at least one of a potassium, a calcium, and a magnesium contained in the nickel manganese cobalt composite hydroxide may be less than 0.0005% by mass.

In this way, it is possible to provide a nickel manganese cobalt composite hydroxide, which is a precursor of a positive electrode active material of a lithium ion secondary battery capable of further improving a battery characteristic with a high void ratio, and also, capable of further decreasing a content of impurities.

In one embodiment of the present invention, a method for producing a nickel manganese cobalt composite hydroxide, which is a precursor of a positive electrode active material, and which is composed of secondary particles to which primary particles containing a nickel, a manganese, and a cobalt are aggregated, or composed of the primary particles and the secondary particles, comprising: a crystallization process for obtaining a transition metal composite hydroxide by crystallizing in a reaction solution obtained by adding a raw material solution containing a nickel, a manganese, and a cobalt, a solution containing an ammonium ion supplier, and an alkaline solution; and a washing process for washing the transition metal composite hydroxide obtained in the crystallization process by a washing liquid, wherein the alkaline solution in the crystallization process is a mixed solution of an alkali metal hydroxide and a carbonate, a ratio $[CO_3^{2-}]/[OH^-]$ of the carbonate with respect to the alkali metal hydroxide in the mixed solution is 0.002 to 0.050, a crystallization is performed by switching an atmosphere in two stages of an oxidizing atmosphere and a non-oxidizing atmosphere in the crystallization process, and the washing liquid in the washing process is an ammonium hydrogen carbonate solution with a concentration of 0.05 mol/L or more.

In this way, it is possible to provide a method for producing a nickel manganese cobalt composite hydroxide, which is a precursor of a positive electrode active material of a lithium ion secondary battery capable of further improving a battery characteristic with a high void ratio, and also, capable of surely decreasing a sodium content.

Here, in one embodiment of the present invention, the crystallization process further comprises a nucleation process and a particle growth process, and in the nucleation process, a nucleation may be performed by adding the alkaline solution to the reaction solution such that a pH measured on the basis of a liquid temperature of 25 degrees Celsius will be 12.0 to 14.0, and in the particle growth process, the alkaline solution may be added to the reaction solution containing nuclei formed in the nucleation process such that a pH measured on the basis of a liquid temperature of 25 degrees Celsius will be 10.5 to 12.0.

In this way, it is possible to obtain a nickel manganese cobalt composite hydroxide having a narrow particle size distribution.

Here, in one embodiment of the present invention, the nickel manganese cobalt composite hydroxide obtained via the washing process is a nickel manganese cobalt composite hydroxide, which is a precursor of a positive electrode active material, and which is composed of secondary particles to which primary particles containing a nickel, a manganese, and a cobalt are aggregated, or composed of the primary particles and the secondary particles, and a sodium content contained in the nickel manganese cobalt composite hydroxide may be less than 0.0005% by mass, and a void ratio of particles of the nickel manganese cobalt composite hydroxide may be 20% to 50%.

In this way, it is possible to provide a nickel manganese cobalt composite hydroxide, which is a precursor of a positive electrode active material of a lithium ion secondary battery capable of further improving a battery characteristic with a high void ratio, and also, capable of surely decreasing a sodium content.

In one embodiment of the present invention, a lithium nickel manganese cobalt composite oxide composed of secondary particles to which primary particles containing a lithium, a nickel, a manganese, and a cobalt are aggregated, or composed of the primary particles and the secondary particles, wherein a sodium content contained in the lithium nickel manganese cobalt composite oxide is less than 0.0005% by mass, and a void ratio of the lithium nickel manganese cobalt composite oxide is 20% to 50%.

In this way, it is possible to provide a lithium nickel manganese cobalt composite oxide, which is a positive electrode active material of a lithium ion secondary battery capable of achieving a high battery capacity, and capable of surely decreasing a sodium content.

Here, in one embodiment of the present invention, a sulfate radical content contained in the lithium nickel manganese cobalt composite oxide may be 0.15% by mass or less, and a chloride radical content may be 0.005% by mass or less, and also, a Me site occupancy factor may be 93.0% or more.

In this way, it is possible to provide a lithium nickel manganese cobalt composite oxide, which is a positive electrode active material of a lithium ion secondary battery capable of achieving a high battery capacity, and capable of surely decreasing a content of a sulfate radical, a chloride radical, and a sodium.

Here, in one embodiment of the present invention, a ratio of an average particle size of the lithium nickel manganese cobalt composite oxide divided by an average particle size of a nickel manganese cobalt composite hydroxide, which is a precursor, may be 0.95 to 1.05.

In this way, it is possible to provide a lithium nickel manganese cobalt composite oxide, which is a positive electrode active material of a lithium ion secondary battery capable of achieving a high battery capacity and a high filling ability, and capable of inhibiting an aggregation by sintering.

Here, in one embodiment of the present invention, when observing 100 or more particles of the lithium nickel manganese cobalt composite oxide selected randomly by a scanning electron microscope, a number that an aggregation of secondary particles is observed may be 5% or less with respect to a total number of observed secondary particles.

In this way, it is possible to provide a lithium nickel manganese cobalt composite oxide, which is a positive electrode active material of a lithium ion secondary battery capable of achieving a high battery capacity and a high filling ability, and capable of inhibiting an aggregation by sintering.

Here, in one embodiment of the present invention, a content of at least one of a potassium, a calcium, and a magnesium contained in the lithium nickel manganese cobalt composite oxide may be less than 0.0005% by mass.

In this way, it is possible to provide a lithium nickel manganese cobalt composite oxide, which is a positive electrode active material of a lithium ion secondary battery capable of achieving a high battery capacity, and capable of further decreasing a content of impurities.

Here, in other embodiment of the present invention, it may be a lithium ion secondary battery comprising a positive electrode at least containing the lithium nickel manganese cobalt composite oxide.

In this way, it is possible to provide a lithium ion secondary battery comprising a positive electrode containing a lithium nickel manganese cobalt composite oxide capable of achieving a high battery capacity, a high filing ability, and an increased void ratio, and also, capable of inhibiting an aggregation by sintering and surely decreasing a sodium content.

According to the present invention, it is possible to provide a nickel manganese cobalt composite hydroxide, which is a precursor of a positive electrode active material of a lithium ion secondary battery capable of further improving a battery characteristic with an increased void ratio, and also, capable of inhibiting an aggregation by sintering and surely decreasing a sodium content especially, a method for producing the nickel manganese cobalt composite hydroxide, a lithium nickel manganese cobalt composite oxide, and a lithium ion secondary battery.

DETAILED DESCRIPTION OF THE INVENTION

Figure 1:
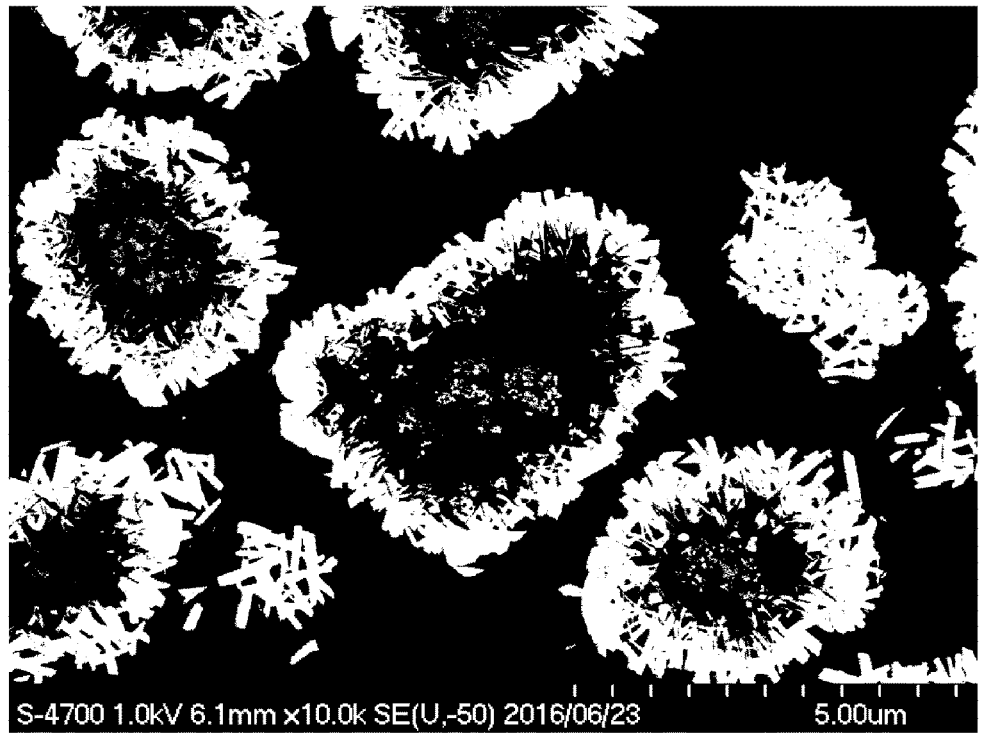
FIG. 1 is a sectional SEM photograph of a nickel manganese cobalt composite hydroxide relating to one embodiment of the present invention, and which is a view illustrating that an internal structure is a hollow structure.

By a keen examination for solving the above problem, the inventors have found that impurities such as a sulfate radical, a chloride radical, and a sodium are decreased to a lower concentration more efficiently, by washing a transition metal composite hydroxide obtained in a crystallization process by using an ammonium hydrogen carbonate solution which is a washing liquid containing a hydrogen carbonate (a bicarbonate) in a washing process, in addition to forming an alkaline solution to be used in the crystallization process as a mixed solution of an alkali metal hydroxide and a carbonate, and controlling a reaction atmosphere in the crystallization process, in a production of a nickel manganese cobalt composite hydroxide, and completed the present invention.

Also, as mentioned in the above, the inventors have found that a lithium nickel manganese cobalt composite oxide, which is a positive electrode active material of a lithium ion secondary battery capable of achieving a high battery capacity and a high filling ability, and capable of inhibiting an aggregation by sintering, is obtained by using a nickel manganese cobalt composite hydroxide, in which a sodium content is surely decreased, as a precursor, and completed the present invention. Hereinafter, explaining about preferred embodiments of the present invention.

In addition, following explained embodiments do not unjustly limit a content of the present invention described in claims, and modifications are possible within a scope that does not depart from a gist of the present invention. Also, not all of configurations explained in the present embodiments are necessary as a means for solving the problem of the present invention. Explaining about a nickel manganese cobalt composite hydroxide relating to one embodiment of the present invention, a method for producing the nickel manganese cobalt composite hydroxide, a lithium nickel manganese cobalt composite oxide, and a lithium ion secondary battery, in a following order.

1. Nickel manganese cobalt composite hydroxide
2. Lithium nickel manganese cobalt composite oxide
3. Method for producing nickel manganese cobalt composite hydroxide
   3-1. Crystallization process
   3-1-1. Nucleation process
   3-1-2. Particle growth process
   3-2. Washing process
4. Lithium ion secondary battery
<1. Nickel Manganese Cobalt Composite Hydroxide>

A nickel manganese cobalt composite hydroxide relating to one embodiment of the present invention is a precursor of a positive electrode active material, and composed of secondary particles to which primary particles containing a nickel, a manganese, and a cobalt are aggregated, or composed of the primary particles and the secondary particles.

And, it is characterized in that a sodium content contained in the nickel manganese cobalt composite hydroxide is less than 0.0005% by mass, and a void ratio of particles of the nickel manganese cobalt composite hydroxide is 20% to 50%. Hereinafter, explaining about a nickel manganese cobalt composite hydroxide relating to one embodiment of the present invention concretely.

[Composition of Particle]

A nickel manganese cobalt composite hydroxide is preferably adjusted to have a composition represented by a general formula: $Ni_xMn_yCo_zM_t(OH)_{2+a}$ (wherein x+y+z+t=1, $0.20 \leq x \leq 0.80$, $0.10 \leq y \leq 0.90$, $0.10 \leq z \leq 0.50$, $0 \leq t \leq 0.10$, $0 \leq a \leq 0.5$, and M is at least one selected from Mg, Ca, Al, Ti, V, Cr, Zr, Nb, Mo, W).

In the general formula, it is preferable that x indicating a nickel content is $0.20 \leq x \leq 0.80$. Also, it is more preferable that x indicating a nickel content is $x \leq 0.6$ when considering an electric characteristic and a heat stability.

In addition, it is preferable that y indicating a manganese content is $0.10 \leq y \leq 0.90$. When a manganese is added in this range, it is possible to improve a safety and a durability of a battery if it is used as a positive electrode active material of the battery. When y is less than 0.10, it is not possible to achieve a sufficient effect of improving a safety and a durability of the battery, on the other hand, when y is more than 0.90, metal elements contributing to a Redox reaction will be reduced and a battery capacity will be deceased, so it is not preferable.

In addition, in the general formula, it is preferable that z indicating a cobalt content is $0.10 \leq z \leq 0.50$. It is possible to reduce an expansion and shrinkage behavior of a crystal lattice by a deinsertion and an insertion of a lithium involving a charge and a discharge or an improvement of a cycle characteristic by adding a cobalt properly, but when z is less than 0.10, it is not possible to achieve a sufficient reduction effect of an expansion and shrinkage behavior of a crystal lattice, so it is not preferable. On the other hand, when an addition amount of a cobalt is too much and z is more than 0.50, a decrease of an initial discharge capacity will be too large, and there is a problem that it will be disadvantageous in a cost, so it is not preferable.

An additive element M is one or more element selected from Mg, Ca, Al, Ti, V, Cr, Zr, Nb, Mo, W, and it is added to improve a battery characteristic such as a cycle characteristic or an output characteristic. It is preferable that t indicating a content of the additive element M is $0 \leq t \leq 0.10$. When t is more than 0.10, metal elements contributing to a Redox reaction will be reduced and a battery capacity will be deceased, so it is not preferable.

In addition, a method for analyzing a composition of particles is not limited particularly, but it can be determined by a chemical analysis method, for example by an acid decomposition—inductively-coupled plasma (ICP) emission spectrometry.

[Particle Structure]

The nickel manganese cobalt composite hydroxide relating to one embodiment of the present invention is composed of secondary particles to which a plurality of primary particles are aggregated, or composed of the primary particles and the secondary particles. The primary particles composing the secondary particles may have various shapes such as a plate shape, a needle shape, a rectangular parallelepiped shape, an elliptical shape, and a rhombohedral shape. Further, the primary particles may be aggregated in random directions. Alternatively, the primary particles aggregated radially from a center along a major axis direction thereof may also be applicable in the present invention.

The secondary particles are preferably formed by an aggregation of a plurality of plate shaped and/or needle shaped primary particles in random directions. The reason for this is that when the secondary particles have such a structure, voids are created substantially uniformly among the primary particles, and therefore when the nickel manganese cobalt composite hydroxide is mixed with a lithium compound and a mixture is fired, the fused lithium compound is distributed in the secondary particles so that a lithium is diffused sufficiently.

It is to be noted that a method for observing shapes of the primary particles and the secondary particles is not limited particularly, but the primary particles and the secondary particles may be measured by observing a cross-section of the nickel manganese cobalt composite hydroxide with a scanning electron microscope (SEM).

[Internal Structure of Particles]

A nickel manganese cobalt composite hydroxide relating to one embodiment of the present invention is having a hollow structure at inside of secondary particles. When a lithium metal composite oxide, in which the nickel manganese cobalt composite hydroxide having the hollow structure is a precursor, is used as a positive electrode active material, it will be excellent in an output characteristic by increasing a contact area with an electrolyte solution.

By the way, "having a hollow structure at inside of secondary particles" means a structure which is composed of a hollow part consisting of a space at a center of a secondary particle and an outer shell part at outside of the hollow part. As illustrated in FIG. 1, this hollow structure can be confirmed by observing a cross section of the lithium metal composite oxide, in addition to the nickel manganese cobalt composite hydroxide, by a scanning electron microscope as indicated by a sectional SEM image.

In addition, in the nickel manganese cobalt composite hydroxide having the hollow structure, a void ratio measured in an observation of a cross section of particles of the nickel manganese cobalt composite hydroxide is preferably 10% to 90%, and further, more preferably 20% to 50%. Also, in the lithium metal composite oxide having the hollow structure, a void ratio measured in an observation of a cross section of particles of the lithium metal composite oxide is preferably 10% to 90%, and further, more preferably 20% to 50%. By this feature, a battery characteristic is improved as a contact area of the positive electrode active material and the electrolyte solution will be sufficient, while maintaining a particle strength within an allowable range, without excessively decreasing a bulk density of the obtained positive electrode active material.

In addition, in the present invention, the nickel manganese cobalt composite hydroxide and the lithium metal composite oxide are having a hollow structure. For example, by adjusting a crystallization condition during a production process of a metal composite hydroxide which will be a supply source of a transition metal such as a nickel, a manganese, and a cobalt, when mixing and firing, it can be a solid structure, a hollow structure, a porous structure, a combination thereof, or they can be mixed in a certain proportion, so there is an advantage that, in the obtained metal composite oxide, an overall composition and a particle size can be stabilized, compared to which a solid structure, a hollow structure, and a porous structure are merely mixed.

[Average Particle Size (MV)]

The nickel manganese cobalt composite hydroxide is preferably adjusted to have an average particle size of 3 to 20 μm. If the average particle size is less than 3 μm, a filling density of particles in a positive electrode formed using a resulting positive electrode active material is decreased so that a battery capacity per volume of the positive electrode is undesirably decreased. On the other hand, if the average particle size is more than 20 μm, a specific surface area of a resulting positive electrode active material is decreased, so that an interface between the positive electrode active material and an electrolyte solution of a battery is reduced, which undesirably increases a resistance of a positive electrode and decreases an output characteristic of the battery. Therefore, when the average particle size of the nickel manganese cobalt composite hydroxide is adjusted to be within a range of 3 to 20 μm, preferably 3 to 15 μm, more preferably 4 to 12 μm, a lithium ion secondary battery using this positive electrode active material as a positive electrode material can have a high battery capacity per volume, a high level of safety, and an excellent cycle characteristic.

A method for measuring an average particle size is not limited particularly. For example, an average particle size may be determined by a volume-based distribution measured by using a laser diffraction scattering method.

[Impurity Content]

Generally, a nickel manganese cobalt composite hydroxide contains a potassium, a calcium, a magnesium and the like, in addition to a sulfate radical, a chloride radical, and a sodium, as impurities. As these impurities will be a cause for deteriorating a reaction with a lithium, and also, as these impurities almost do not contribute to charge and discharge reactions, it is preferable to reduce a content of these impurities by removing these impurities as much as possible. In addition, particles of a lithium nickel manganese cobalt composite oxide tend to sinter and aggregate, by a sodium and the like dissolving to a lithium site, so it is preferable to reduce a content of these impurities by removing these impurities as much as possible. Conventionally, technologies for removing these impurities have been disclosed, but these conventional technologies are still insufficient.

Here, a nickel manganese cobalt composite hydroxide relating to one embodiment of the present invention is characterized in that a sodium content contained in the nickel manganese cobalt composite hydroxide is less than 0.0005% by mass. In this way, it is possible to provide a nickel manganese cobalt composite hydroxide, which is a precursor of a positive electrode active material of a lithium ion secondary battery capable of improving a battery characteristic, and capable of surely decreasing a sodium content.

As mentioned in the above, in a prior art, a sodium remains for 0.001% to 0.015% by mass, and a reduction of a sodium is insufficient. In addition, in a prior art, there is a document describing that a sodium content is a certain numerical value or less, but a composite hydroxide or a composite oxide in which a sodium content will be an extremely low concentration of less than 0.0005% by mass, as the nickel manganese cobalt composite hydroxide relating to one embodiment of the present invention or the lithium nickel manganese cobalt composite oxide described in below, is not disclosed practically. According to a production method described in below, a sodium content with an extremely low concentration of less than 0.0005% by mass is achieved. In this way, an aggregation by sintering when forming the lithium nickel manganese cobalt composite oxide is inhibited.

In addition, a sulfate radical content contained in the nickel manganese cobalt composite hydroxide is preferably 0.2% by mass or less, and also, a chloride radical content is preferably 0.01% by mass or less. In this way, it is possible to provide a nickel manganese cobalt composite hydroxide, which is a precursor of a positive electrode active material of a lithium ion secondary battery capable of improving a battery characteristic, and capable of surely decreasing a content of a sulfate radical, a chloride radical, and a sodium.

A content of at least one of a potassium, a calcium, and a magnesium contained in the nickel manganese cobalt composite hydroxide is preferably less than 0.0005% by mass. In this way, it is possible to provide a nickel manganese cobalt composite hydroxide, which is a precursor of a positive electrode active material of a lithium ion secondary battery capable of further improving a battery characteristic with a high void ratio, and also, capable of further decreasing a content of impurities.

About a content of each impurity, it is possible to determine by using an analysis method indicated in below. A potassium, a calcium, a magnesium and the like, including a sodium can be determined by an acid decomposition—atomic absorption spectrometry, an acid decomposition—ICP emission spectrometry, or the like. In addition, a sulfate radical can be determined by analyzing an entire sulfur content of the nickel manganese cobalt composite hydroxide by a combustion infrared absorption method, an acid decomposition—ICP emission spectrometry, or the like, and by converting this entire sulfur content into a sulfate radical $(SO_4^{2-})$. In addition, a chloride radical can be determined by analyzing the nickel manganese cobalt composite hydroxide directly, or by analyzing a chloride radical by separating a chloride radical contained in a distillation operation in a form of a silver chloride or the like, by an X-ray fluorescence (XRF) analysis.

[Particle Size Distribution]

The nickel manganese cobalt composite hydroxide is preferably adjusted such that a value of [(d90–d10)/average particle size], which is an index indicating a spread of a particle size distribution of particles, is 0.55 or less.

For instance, when the nickel manganese cobalt composite hydroxide has a wide particle size distribution and therefore a value of [(d90–d10)/average particle size], which is an index indicating a spread of a particle size distribution, is more than 0.55, the nickel manganese cobalt composite hydroxide tends to contain many fine particles whose particle sizes are much smaller than an average particle size or many particles (large-sized particles) whose particle sizes are much larger than an average particle size.

Such features of a particle size distribution at a stage of a precursor have a great effect on a positive electrode active material obtained after a firing process. When a positive electrode is formed using a positive electrode active material containing many fine particles, not only there is a possibility that a safety will be decreased as there is a risk of a heat generation by a local reaction of the fine particles, but also there is a possibility that a cycle characteristic will be deteriorated due to a selective degradation of the fine particles having a large specific surface area, so it is not preferable. On the other hand, when a positive electrode is formed using a positive electrode active material containing many large-sized particles, there is a possibility that a battery output will be decreased due to an increase in a reaction resistance, as an adequate reaction area between an electrolyte solution and the positive electrode active material is not provided, so it is not preferable.

Therefore, in a particle size distribution of the nickel manganese cobalt composite hydroxide, which is a precursor, it is preferable that [(d90–d10)/average particle size] is 0.55 or less, and as a ratio of fine particles or large-sized particles will be low, a lithium ion secondary battery having a positive electrode using this positive electrode active material can have a high level of safety, an excellent cycle characteristic, and a high battery output.

In addition, in [(d90–d10)/average particle size] which is an index indicating a spread of a particle size distribution, d10 means a particle size at which a cumulative volume of particles reaches 10% of a total volume of all particles when a number of particles in each particle size is counted from a smaller particle size. On the other hand, d90 means a particle size at which a cumulative volume of particles reaches 90% of a total volume of all particles when a number of particles in each particle size is counted from a smaller particle size. A method for determining an average particle size, d90, and d10 is not limited particularly. For example, an average particle size, d90, and d10 may be determined by a volume-based distribution measured by using a laser diffraction scattering method.

[Specific Surface Area]

The nickel manganese cobalt composite hydroxide is preferably adjusted to have a specific surface area of 10 to 80 m$^2$/g, and if it is a solid type with no void in particles, it is preferably adjusted to have a specific surface area of 10 to 20 m$^2$/g. This is because when the nickel manganese cobalt composite hydroxide having a specific surface area in the above range is mixed with a lithium compound and a mixture is fired, the particles of the nickel manganese cobalt composite hydroxide can secure a sufficient surface area to come into contact with the fused lithium compound, and also, a particle strength of the formed positive electrode active material will be satisfactory.

On the other hand, if a specific surface area is less than 10 m$^2$/g, there is a concern that when the nickel manganese cobalt composite hydroxide is mixed with a lithium compound and a mixture is fired, the nickel manganese cobalt composite hydroxide cannot sufficiently come into contact with the fused lithium compound so that a crystallinity of a resulting lithium nickel manganese cobalt composite oxide will be decreased, and a capacity of a lithium ion secondary battery using the lithium nickel manganese cobalt composite oxide as a positive electrode material will be decreased due to an inhibition of Li diffusion in a solid phase. In addition, if a specific surface area is more than 80 m$^2$/g, there is a possibility that when the nickel manganese cobalt composite hydroxide is mixed with a lithium compound and a mixture is fired, a crystal growth proceeds excessively and a cation mixing occurs, in which nickels enter into lithium layers of a resulting lithium transition metal composite oxide which is a layered compound, and a charge and discharge capacity will be decreased, so it is not preferable.

Further, as the nickel manganese cobalt composite hydroxide relating to one embodiment of the present invention, if it is having a hollow structure with a space at a center of secondary particles, it is more preferable to adjust such that a specific surface area will be 30 to 40 m$^2$/g. If a specific surface area is less than 30 m$^2$/g, it is difficult to achieve a certain void ratio, and reacting areas with lithium compounds at the time of firing cannot be secured sufficiently. If a specific surface area is more than 40 m$^2$/g, a filling ability will be deteriorated when a positive electrode active material with a hollow structure is formed.

A method for measuring a specific surface area is not limited particularly. For example, a specific surface area may be determined by a nitrogen gas adsorption and desorption method by a BET multipoint method or a BET one-point method.

In FIG. 1, a sectional SEM photograph of a nickel manganese cobalt composite hydroxide relating to one embodiment of the present invention is illustrated. As such, in the nickel manganese cobalt composite hydroxide relating to one embodiment of the present invention, an internal structure is a hollow structure as illustrated in FIG. 1.

According to the nickel manganese cobalt composite hydroxide relating to one embodiment of the present invention, it is possible to provide a precursor of a positive electrode active material of a lithium ion secondary battery capable of improving a battery characteristic, and capable of surely decreasing a sodium content especially. In addition, as mentioned in the above, by using the nickel manganese cobalt composite hydroxide in which a sodium content is surely decreased as a precursor, it is possible to provide a lithium nickel manganese cobalt composite oxide, which is a positive electrode active material of a lithium ion secondary battery capable of achieving a high battery capacity and a high filling ability, and also, capable of inhibiting an aggregation by sintering.

<2. Lithium Nickel Manganese Cobalt Composite Oxide>

A lithium nickel manganese cobalt composite oxide relating to one embodiment of the present invention is composed of secondary particles to which primary particles containing a lithium, a nickel, a manganese, and a cobalt are aggregated, or composed of the primary particles and the secondary particles. And, it is characterized in that a sodium content contained in the lithium nickel manganese cobalt composite oxide is less than 0.0005% by mass, and a void ratio of the lithium nickel manganese cobalt composite oxide is 20% to 50%.

In addition, a sulfate radical content contained in the lithium nickel manganese cobalt composite oxide is preferably 0.15% by mass or less, a chloride radical content is preferably 0.005% by mass or less, and also, a Me site occupancy factor is preferably 93.0% or more.

A ratio of an average particle size of the lithium nickel manganese cobalt composite oxide divided by an average particle size of a nickel manganese cobalt composite hydroxide, which is a precursor, i.e. "MV of lithium nickel manganese cobalt composite oxide/MV of nickel manganese cobalt composite hydroxide" (hereinafter, also referred to as "MV ratio") can be evaluated as an index indicating an aggregation by sintering. A range of this MV ratio is preferably 0.95 to 1.05, and more preferably 0.97 to 1.03.

When this MV ratio is in the above range, a positive electrode active material is composed of a lithium nickel manganese cobalt composite oxide, in which an aggregation of the secondary particles themselves in association with an aggregation by sintering hardly occurs. A secondary battery using such positive electrode active material is having a high filling ability and a high battery capacity, and is excellent in a uniformity with less variation in a characteristic.

On the other hand, when the MV ratio is more than 1.05, a specific surface area and a filling ability may be decreased in association with an aggregation by sintering. In a secondary battery using such positive electrode active material, an output characteristic and a battery capacity may be decreased, as a reactivity will be deteriorated. In addition, when charged and discharged repeatedly, there is a risk of impairing a cycle characteristic significantly, as a collapse occurs selectively from a portion with a weak strength where secondary particles themselves are aggregated in a positive electrode, so when estimated safely, the MV ratio is preferably 1.05 or less, and more preferably 1.03 or less.

Further, when the MV ratio is less than 0.95, it is considered that a particle size is decreased as some primary particles are lost from secondary particles in a production process of a lithium nickel manganese cobalt composite oxide, and thereby, a particle size distribution may be wide, so the MV ratio is preferably 0.95 or more, and more preferably 0.97 or more.

In addition, a MV of a nickel manganese cobalt composite hydroxide means a MV of a nickel manganese cobalt composite hydroxide used as a precursor when producing a lithium nickel manganese cobalt composite oxide. Also, if a crushing process is performed, a MV of a lithium nickel manganese cobalt composite oxide means a MV of a lithium nickel manganese cobalt composite oxide after the crushing process. In addition, a MV of each particle may be measured by a laser diffraction scattering particle size distribution measuring device, and a MV of each particle means a particle size in which an accumulated volume will be an average value of a total volume of all particles when accumulating a number of particles in each particle size from a smaller particle size.

In addition, when observing 100 or more particles of a lithium nickel manganese cobalt composite oxide selected randomly by a scanning electron microscope (SEM), a number that an aggregation of secondary particles is observed may be 5% or less, 3% or less, or 2% or less with respect to a total number of observed secondary particles. When a number in which an aggregation of secondary particles is observed is in the above range, it indicates that an aggregation by sintering of secondary particles is inhibited sufficiently. Also, when a MV of a positive electrode active material is in the above range, a number in which an aggregation of secondary particles is observed can be easily controlled to be in the above range. In addition, a magnification of a scanning electron microscope (SEM) when observing is, for example about 1000 times.

When a number in which an aggregation of secondary particles is observed is 5% or less with respect to a total number of observed secondary particles, a positive electrode active material is composed of a lithium nickel manganese cobalt composite oxide, in which an aggregation of the secondary particles themselves in association with an aggregation by sintering hardly occurs. A secondary battery using such positive electrode active material is having a high filling ability and a high battery capacity, and is excellent in a uniformity with less variation in a characteristic.

On the other hand, when a number in which an aggregation of secondary particles is observed is more than 5% with respect to a total number of observed secondary particles, a specific surface area and a filling ability may be decreased in association with an aggregation by sintering. In a secondary battery using such positive electrode active material, an output characteristic and a battery capacity may be decreased, as a reactivity will be deteriorated. In addition, when charged and discharged repeatedly, there is a risk of impairing a cycle characteristic significantly, as a collapse occurs selectively from a portion with a weak strength where secondary particles themselves are aggregated in a positive electrode, so when estimated safely, it is preferably 5% or less.

A content of at least one of a potassium, a calcium, and a magnesium contained in the lithium nickel manganese cobalt composite oxide is preferably less than 0.0005% by mass. In this way, it is possible to provide a lithium nickel manganese cobalt composite oxide, which is a positive electrode active material of a lithium ion secondary battery capable of achieving a high battery capacity, and also, capable of further decreasing a content of impurities.

The nickel manganese cobalt composite hydroxide can produce a lithium nickel manganese cobalt composite oxide by mixing with a lithium compound and firing a mixture. And, the lithium nickel manganese cobalt composite oxide can be used as a raw material of a positive electrode active material of a lithium ion secondary battery.

The lithium nickel manganese cobalt composite oxide used as a positive electrode active material can be obtained via a firing process after mixing a nickel manganese cobalt composite hydroxide, which is a precursor, with a lithium compound such as a lithium nitrate ($LiNO_3$: Melting point 261 degrees Celsius), a lithium chloride (LiCl: Melting point 613 degrees Celsius), and a lithium sulfate ($Li_2SO_4$: Melting point 859 degrees Celsius), including a lithium carbonate ($Li_2CO_3$: Melting point 723 degrees Celsius) and a lithium hydroxide (LiOH: Melting point 462 degrees Celsius).

Regarding a lithium compound, it is especially preferable to use a lithium carbonate or a lithium hydroxide considering an easiness of handling and a stability of quality.

In this firing process, a carbonate radical, a hydroxyl group, a nitrate radical, a chloride radical, and a sulfate radical, which may be components of a lithium compound, will be volatilized, but a small proportion of them remains in a positive electrode active material. About a hollow structure of secondary particles, in addition to a particle size distribution and a specific surface area, including nonvolatile components such as a sodium, characteristics of a nickel manganese cobalt composite hydroxide, which is a precursor, will be almost succeeded.

According to a lithium nickel manganese cobalt composite oxide relating to one embodiment of the present invention, it is possible to provide a positive electrode active material of a lithium ion secondary battery capable of further improving a battery characteristic with a high void ratio, and also, capable of surely decreasing a sodium content especially.

<3. Method for Producing Nickel Manganese Cobalt Composite Hydroxide>

Figure 2:
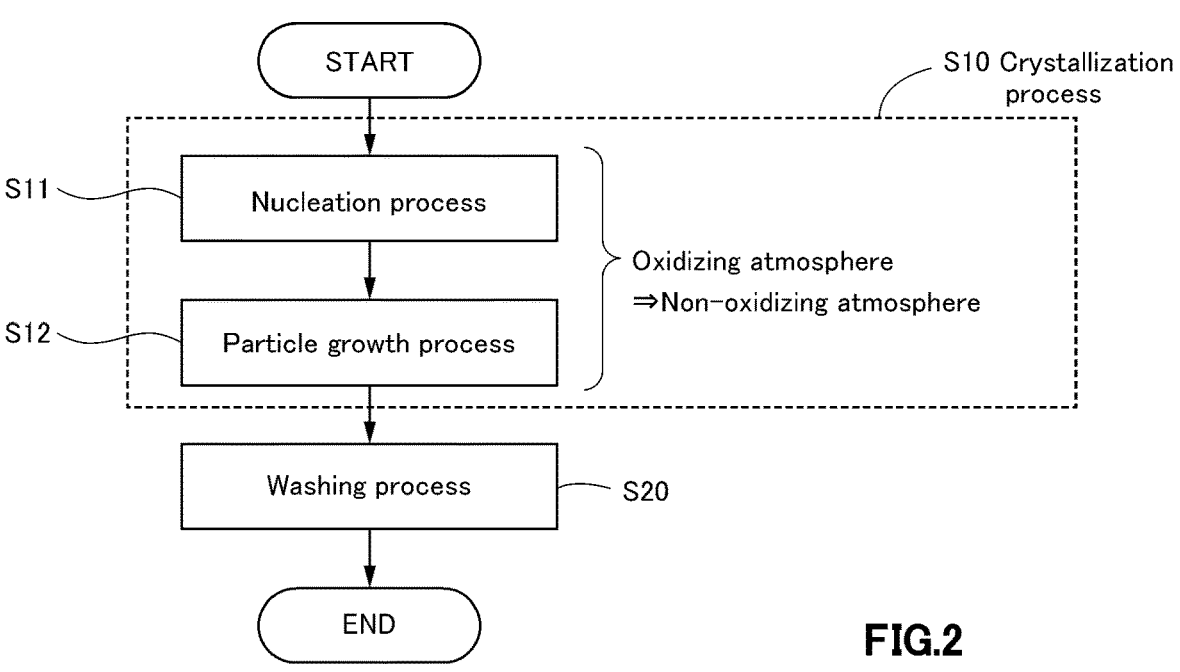
FIG. 2 is a flow chart illustrating an outline of a method for producing a nickel manganese cobalt composite hydroxide relating to one embodiment of the present invention.

Next, explaining about a method for producing a nickel manganese cobalt composite hydroxide relating to one embodiment of the present invention, using FIG. 2. A method for producing a nickel manganese cobalt composite hydroxide relating to one embodiment of the present invention is a method for producing a precursor of a positive electrode active material composed of secondary particles to which primary particles containing a nickel, a manganese, and a cobalt are aggregated, or composed of the primary particles and the secondary particles. And, as illustrated in FIG. 2, it comprises a crystallization process S10 and a washing process S20.

In a crystallization process S10, a transition metal composite hydroxide is obtained by crystallizing in a reaction solution obtained by adding a raw material solution containing a nickel, a manganese, and a cobalt, a solution containing an ammonium ion supplier, and an alkaline solution. And, in a washing process S20, the transition metal composite hydroxide obtained in the crystallization process S10 is washed by a washing liquid.

In addition, the alkaline solution in the crystallization process S10 is a mixed solution of an alkali metal hydroxide and a carbonate, a molar ratio $[CO_3^{2-}]/[OH^-]$ of the carbonate with respect to the alkali metal hydroxide of the mixed solution is 0.02 to 0.05, and in the crystallization process S10, a crystallization is performed by switching an atmosphere in two stages of an oxidizing atmosphere and a non-oxidizing atmosphere, and the washing liquid in the washing process S20 is an ammonium hydrogen carbonate solution with a concentration of 0.05 mol/L or more. Hereinafter, explaining in detail per process.

<3-1. Crystallization Process>

In a crystallization process S10, a transition metal composite hydroxide is obtained by crystallizing in a reaction solution obtained by adding a raw material solution containing a nickel, a manganese, and a cobalt, a solution containing an ammonium ion supplier, and an alkaline solution.

In addition, the crystallization process S10 is further having a nucleation process S11 and a particle growth process S12 preferably. In the nucleation process S11, a nucleation is performed in a reaction solution by adding an alkaline solution such that a pH of the reaction solution measured on the basis of a liquid temperature of 25 degrees Celsius will be 12.0 to 14.0, and in the particle growth process S12, an alkaline solution is preferably added to a reaction solution containing nuclei formed in the nucleation process S11 such that a pH of the reaction solution measured on the basis of a liquid temperature of 25 degrees Celsius will be 10.5 to 12.0. Detail will be described later.

In a conventional continuous crystallization process, a nucleation reaction and a particle growth reaction proceed simultaneously in the same reaction tank, so a particle size distribution of an obtained precursor was widespread. On the other hand, in a method for producing a nickel manganese cobalt composite hydroxide of the present invention, a time when a nucleation reaction mainly occurs (nucleation process) and a time when a particle growth reaction mainly occurs (particle growth process) are clearly separated from each other. Therefore, even when both processes are performed in the same reaction tank, a transition metal composite hydroxide having a narrow particle size distribution is obtained. Also, it is possible to reduce impurities such as a sulfate radical by using a mixed solution of an alkali metal hydroxide and a carbonate as an alkaline solution.

Hereinafter, explaining in detail about a condition and a material to be used in a method for producing a nickel manganese cobalt composite hydroxide of the present invention.

[Raw Material Solution Containing Nickel, Manganese, and Cobalt]

Metal salts used in a raw material solution containing a nickel, a manganese, and a cobalt, such as a nickel salt, a manganese salt, and a cobalt salt, are not limited particularly as long as it is a water-soluble compound, but a sulfate, a nitrate, a chloride and else may be used. For example, a nickel sulfate, a manganese sulfate, and a cobalt sulfate are preferably used.

Also, it is possible to form a raw material solution by mixing a compound containing one or more additive elements M at a predetermined ratio according to need. In the crystallization process S10 of this case, it is preferable to use a compound containing one or more additive elements selected from Mg, Ca, Al, Ti, V, Cr, Zr, Nb, Mo, W, and for example, a titanium sulfate, an ammonium peroxotitanate, a titanium potassium oxalate, a vanadium sulfate, an ammonium vanadate, a chromium sulfate, a potassium chromate, a zirconium sulfate, a zirconium nitrate, a niobium oxalate, an ammonium molybdate, a sodium tungstate, an ammonium tungstate and else may be used.

Also, a nickel manganese cobalt composite hydroxide may be coated with a compound containing one or more additive elements M, by adjusting a pH of a slurry obtained by mixing the nickel manganese cobalt composite hydroxide obtained by a crystallization with an aqueous solution containing one or more additive elements M.

A concentration of the raw material solution is preferably 1 mol/L to 2.6 mol/L, more preferably 1 mol/L to 2.2 mol/L as a concentration of total metal salts. If a concentration of the raw material solution is less than 1 mol/L, a concentration of a resulting hydroxide slurry will be low, and which deteriorates productivity. On the other hand, if a concentration of the raw material solution is more than 2.6 mol/L, there is a risk that a crystal deposition or a freezing occurs at −5 degrees Celsius or less, and that pipes of an equipment will be clogged, so the pipes need to be kept warm or heated, which increases a cost.

Further, an amount of the raw material solution supplied to a reaction tank is preferably adjusted such that a concentration of a crystallized product, when a crystallization reaction is finished, is generally 30 g/L to 250 g/L, and preferably 80 g/L to 150 g/L. If a concentration of the crystallized product is less than 30 g/L, an aggregation of primary particles may be insufficient. If a concentration of the crystallized product is more than 250 g/L, a diffusion of an added mixed aqueous solution in the reaction tank may be insufficient, so that particles may not grow uniformly.

[Ammonium Ion Supplier]

An ammonium ion supplier in a reaction solution is not limited particularly as long as it is a water-soluble compound, and an ammonia water, an ammonium sulfate, an ammonium chloride, an ammonium carbonate, an ammonium fluoride and else may be used. For example, an ammonia water or an ammonium sulfate is preferably used.

A concentration of ammonium ions in the reaction solution is adjusted to be preferably 3 g/L to 25 g/L, more preferably 5 g/L to 20 g/L, even more preferably 5 g/L to 15 g/L. When ammonium ions are present in the reaction solution, metal ions, especially Ni ions form an ammine complex, so that a solubility of metal ions will be increased. This promotes a growth of primary particles, so that dense particles of the nickel manganese cobalt composite hydroxide are likely to be obtained. Further, since a solubility of metal ions is stabilized, particles of the nickel manganese cobalt composite hydroxide uniform in a shape and a particle size are likely to be obtained. Particularly, by making a concentration of ammonium ions in the reaction solution to be 3 g/L to 25 g/L, more dense particles of the composite hydroxide uniform in a shape and a particle size are likely to be obtained.

If a concentration of ammonium ions in the reaction solution is less than 3 g/L, a solubility of metal ions may be unstable, so that primary particles uniform in a shape and a particle size are not formed, and particles having a wide particle size distribution may be obtained as gel nuclei are generated. On the other hand, if a concentration of ammonium ions in the reaction solution is more than 25 g/L, a solubility of metal ions may be increased excessively, and an amount of metal ions remaining in the reaction solution may be increased, so that a composition deviation may occur. A concentration of ammonium ions can be measured by an ion electrode method (ion meter).

[Alkaline Solution]

An alkaline solution is prepared as a mixed solution of an alkali metal hydroxide and a carbonate. In the alkaline solution, a molar ratio of the carbonate to the alkali metal hydroxide, which is represented by $[CO_3^{2-}]/[OH^-]$, is 0.002 to 0.050, preferably 0.005 to 0.030, more preferably 0.010 to 0.025.

When the alkaline solution is a mixed solution of an alkali metal hydroxide and a carbonate, anions such as sulfate radicals and chloride radicals that remain as impurities in the nickel manganese cobalt composite hydroxide obtained in the crystallization process S10 can be removed by substituting to carbonate radicals. The carbonate radicals are volatilized preferentially in a process to mix the nickel manganese cobalt composite hydroxide with a lithium compound and to fire a mixture, as carbonate radicals are more likely to be volatilized by an ignition compared to the sulfate radicals, the chloride radicals, and the like, so the carbonate radicals will not be remained in a lithium nickel manganese cobalt composite oxide which is a positive electrode material.

If the molar ratio $[CO_3^{2-}]/[OH^-]$ of the carbonate to the alkali metal hydroxide is less than 0.002, a substitution of impurities such as sulfate radicals and chloride radicals derived from raw materials to carbonate ions will be insufficient in the crystallization process S10, so these impurities are likely to be incorporated into the nickel manganese cobalt composite hydroxide. On the other hand, even when $[CO_3^{2-}]/[OH^-]$ is more than 0.050, an effect to reduce sulfate radicals and chloride radicals, which are impurities derived from raw materials, is not enhanced, so excessively added carbonates will increase a cost.

The alkali metal hydroxide is preferably at least one selected from a lithium hydroxide, a sodium hydroxide, and a potassium hydroxide, as an addition amount of such water-soluble compound can be controlled easily.

The carbonate is preferably at least one selected from a sodium carbonate, a potassium carbonate, and an ammonium carbonate, as an addition amount of such water-soluble compound can be controlled easily.

In addition, a method for adding the alkaline solution to the reaction tank is not limited particularly, and the alkaline solution may be added by a pump that can control a flow rate, such as a metering pump, such that a pH of the reaction solution will be maintained in a range described in below.

[pH Control]

It is more preferable that the crystallization process S10 comprises: a nucleation process S11 in which a nucleation is performed by adding an alkaline solution to a reaction solution such that a pH of the reaction solution measured on the basis of a liquid temperature of 25 degrees Celsius will be 12.0 to 14.0; and a particle growth process S12 in which nuclei formed in the nucleation process S11 are grown by controlling a solution for particle growth containing the nuclei by adding an alkaline solution such that a pH of the solution for particle growth measured on the basis of a liquid temperature of 25 degrees Celsius will be 10.5 to 12.0.

That is, a nucleation reaction and a particle growth reaction do not proceed at the same time in the same vessel, but a time when a nucleation reaction mainly occurs (nucleation process S11) and a time when a particle growth reaction mainly occurs (particle growth process S12) are clearly separated from each other. Hereinafter, explaining in detail about the nucleation process S11 and the particle growth process S12.

<3-1-1. Nucleation Process>

In the nucleation process S11, a pH of the reaction solution is controlled to be in a range of 12.0 to 14.0 as a pH measured on the basis of a liquid temperature of 25 degrees Celsius. If a pH is more than 14.0, there is a problem that excessively fine nuclei are formed, so that the reaction aqueous solution will be gelled. On the other hand, if a pH is less than 12.0, a nucleus growth reaction occurs together with a nucleation, so that non-uniform nuclei will be formed as a range of a particle size distribution of formed nuclei will be wide.

Therefore, when a pH of the reaction solution is controlled to be 12.0 to 14.0 in the nucleation process S11, a growth of nuclei is inhibited and almost only nucleation can occur, so that uniform nuclei are formed and a range of a particle size distribution will be narrower.

<3-1-2. Particle Growth Process>

In the particle growth process S12, a pH of the reaction solution needs to be controlled to be in a range of 10.5 to 12.0, preferably 11.0 to 12.0 as a pH measured on the basis of a liquid temperature of 25 degrees Celsius. If a pH is more than 12.0, many nuclei are newly formed so that fine secondary particles are formed, which makes it impossible to obtain a nickel manganese cobalt composite hydroxide having an excellent particle size distribution. Further, if a pH is less than 10.5, a solubility of metal ions by ammonium ions is increased, so that metal ions remaining in the solution without being deposited will be increased, and a production efficiency may be deteriorated.

That is, when a pH of the reaction solution is controlled to be 10.5 to 12.0 in the particle growth process S12, only a growth of nuclei formed in the nucleation process S11 occurs preferentially, and a formation of new nuclei can be inhibited, so that it is possible to obtain a uniform nickel manganese cobalt composite hydroxide having a narrower particle size distribution.

It is to be noted that when a pH is 12.0, the reaction solution is under a boundary condition between a nucleation and a particle growth. In this case, either the nucleation process or the particle growth process may be performed depending on a presence of nuclei in the reaction solution. That is, when a pH in the particle growth process S12 is adjusted to 12.0, after adjusting a pH in the nucleation process S11 to be higher than 12.0 to form a large amount of nuclei, a growth of nuclei occurs preferentially as a large amount of nuclei are present in the reaction solution, and the nickel manganese cobalt composite hydroxide having a narrower particle size distribution and a relatively large particle size is obtained.

On the other hand, when nuclei are not present in the reaction solution, that is, when a pH is adjusted to 12.0 in the nucleation process S11, a nucleation occurs preferentially as there is no nucleus to grow, and formed nuclei can grow by adjusting a pH in the particle growth process S12 to be less than 12.0, so that an excellent nickel manganese cobalt composite hydroxide can be obtained.

In either case, a pH in the particle growth process S12 shall be controlled to be lower than a pH in the nucleation process S11. In order to clearly separate a nucleation and a particle growth from each other, a pH in the particle growth process S12 is preferably lower than a pH in the nucleation process S11 by 0.5 or more, more preferably by 1.0 or more.

As described above, by clearly separating the nucleation process S11 and the particle growth process S12 from each other by controlling a pH, a nucleation occurs preferentially and a growth of nuclei hardly occurs in the nucleation process S11, and on the other hand, only a growth of nuclei occurs and new nuclei are hardly formed in the particle growth process S12. Therefore, uniform nuclei having a narrow particle size distribution can be formed in the nucleation process S11, and the nuclei can be grown uniformly in the particle growth process S12. Therefore, in the method for producing the nickel manganese cobalt composite hydroxide, it is possible to obtain uniform nickel manganese cobalt composite hydroxide particles having a narrower particle size distribution.

[Temperature of Reaction Solution]

A temperature of the reaction solution in the reaction tank is preferably set to 20 to 80 degrees Celsius, more preferably 30 to 70 degrees Celsius, even more preferably 35 to 60 degrees Celsius. If a temperature of the reaction solution is less than 20 degrees Celsius, a nucleation is likely to occur due to a low solubility of metal ions, which makes it difficult to control a nucleation. On the other hand, if a temperature of the reaction solution is more than 80 degrees Celsius, a volatilization of ammonia is promoted, so the ammonium ion supplier needs to be added excessively to maintain a predetermined ammonia concentration, which increases a cost.

[Reaction Atmosphere]

A particle size and a particle structure of the nickel manganese cobalt composite hydroxide are also controlled by a reaction atmosphere in the crystallization process S10. Therefore, in the crystallization process S10 in the method for producing the nickel manganese cobalt composite hydroxide relating to one embodiment of the present invention, a crystallization is performed by switching an atmosphere in two stages of an oxidizing atmosphere and a non-oxidizing atmosphere. Concretely, a crystallization is performed in an oxidizing atmosphere, and then, a crystallization is performed by switching an atmosphere in the reaction tank to a non-oxidizing atmosphere.

When an atmosphere in the reaction tank during the crystallization process S10 is controlled to be a non-oxidizing atmosphere, a growth of primary particles that constitute a nickel manganese cobalt composite hydroxide is promoted, so that secondary particles with an appropriately large particle size are formed from large and dense primary particles. On the other hand, when an atmosphere in the reaction tank during the crystallization process S10 is controlled to be an oxidizing atmosphere, a growth of primary particles that constitute a nickel manganese cobalt composite hydroxide is inhibited, so that secondary particles with a space at a center of a particle, or in which many fine voids are dispersed, are formed from fine primary particles.

In the method for producing the nickel manganese cobalt composite hydroxide relating to one embodiment of the present invention, a crystallization is performed by switching an atmosphere in two stages of an oxidizing atmosphere and a non-oxidizing atmosphere in the crystallization process S10. By adjusting a time to switch the above atmospheres, it is possible to control a size of a hollow part of a particle when forming a hollow structure, and a proportion of voids when forming a porous structure.

By the way, a non-oxidizing atmosphere is indicating a mixed atmosphere of an inert gas and an oxygen with an oxygen concentration of 5.0% by volume or less, preferably 2.5% by volume or less, more preferably 1.0% by volume or less. As a means for maintaining a space in the reaction tank to be such a non-oxidizing atmosphere, to circulate an inert gas such as a nitrogen into a space in the reaction tank, and further, to bubble an inert gas in the reaction solution, can be cited. In addition, in the crystallization process S10, a preferable flow rate of a bubbling is 3 to 7 L/min, and more preferably about 5 L/min.

On the other hand, an oxidizing atmosphere is indicating an atmosphere with an oxygen concentration of more than 5.0% by volume, preferable 10.0% by volume or more, more preferably 15.0% by volume or more. As a means for maintaining a space in the reaction tank to be such an oxidizing atmosphere, to circulate an air or the like into a space in the reaction tank, and further, to bubble an air or the like in the reaction solution, can be cited.

When forming a hollow structure, an atmosphere in the reaction tank will be an oxidizing atmosphere (normally, oxygen concentration is more than 21% by volume, for example an air atmosphere), and for example, it is preferable that a crystallization treatment is performed within 0.5 hours, and a crystallization treatment will be stopped by stopping a supply of the solution after the predetermined time. Then, it is preferable that it will be switched to an inert atmosphere, or a non-oxidizing atmosphere in which an oxygen concentration is controlled to be 0.2% by volume or less, and a crystallization is performed within a range of 0.5 to 3.5 hours to change a crystallization state, in order to control a void ratio of an obtained metal composite hydroxide to be 20% to 50%, and to produce a nickel manganese cobalt composite hydroxide with a porous structure.

In this way, by controlling an atmosphere in the reaction tank to a non-oxidizing atmosphere or an oxidizing atmosphere, a void ratio of secondary particles in the obtained metal composite hydroxide is controlled.

In addition, it is explained about the nucleation process S11 and the particle growth process S12 in the above, but a control of the reaction atmosphere is performed simultaneously while proceeding a nucleation and a particle growth.

[Void Ratio]

After embedding a nickel manganese cobalt composite hydroxide into a resin, particles of the nickel manganese cobalt composite hydroxide are cut by an argon sputtering using a cross-section polisher (CP), and a sectional surface of particles will be exposed. The exposed sectional surface of particles is observed by using a scanning electron microscope, and an image of the observed sectional surface of particles is analyzed by an image analyzing software, by making voids in the image to be black, and also, by making dense parts to be white, and it is possible to determine a void ratio by calculating an area of a black part divided by (a black part+a white part) with respect to a sectional surface of optional 20 or more particles.

<3-2. Washing Process>

In a washing process S20, a transition metal composite hydroxide obtained in the crystallization process S10 is washed by a washing liquid.

[Type of Washing Liquid]

In the washing process S20, it is washed by a washing liquid based on a carbonate, a hydrogen carbonate (a bicarbonate), and a hydroxide of an alkali metal salt or an ammonium salt. Preferably, the transition metal composite hydroxide is washed by using a washing liquid in which a carbonate, a hydrogen carbonate (a bicarbonate), or a mixture thereof is dissolved in a water.

In this way, anions of impurities such as a sulfate radical and a chloride radical can be removed efficiently by using a substitution reaction with carbonate ions and hydrogen carbonate ions (bicarbonate ions) in the washing liquid. In addition, by using a carbonate and a hydrogen carbonate (a bicarbonate), it is possible to inhibit a mixing of an alkali metal such as a sodium, compared to a case using a hydroxide. In addition, in a transition metal composite hydroxide with a void structure, it is difficult to remove impurities in a particle when a hydroxide is used, and also in this point, it is effective to use a carbonate and a hydrogen carbonate (a bicarbonate).

As a carbonate, it is preferable to select a potassium carbonate, and as a hydrogen carbonate (a bicarbonate), it is preferable to select a potassium hydrogen carbonate, or an ammonium hydrogen carbonate. In addition, among a carbonate and a hydrogen carbonate (a bicarbonate), by selecting an ammonium salt, cations of impurities such as a sodium can be removed efficiently by using a substitution reaction with ammonium ions in the washing liquid. Further, among ammonium salt, by selecting an ammonium hydrogen carbonate (an ammonium bicarbonate), cations of a sodium or the like can be removed most efficiently.

It is considered that not only a substitution reaction between cations of a sodium or the like and ammonium ions, but also a characteristic of an ammonium hydrogen carbonate (an ammonium bicarbonate) more excellent than other salts, that is a high foaming efficiency of a carbonate gas when used as the washing liquid, is contributing significantly for removing cations of a sodium or the like.

[Concentration and pH]

A concentration of an ammonium hydrogen carbonate solution which is a washing liquid is 0.05 mol/L or more. When the concentration is less than 0.05 mol/L, there is a risk that an effect for removing impurities such as a sulfate radical, a chloride radical, a sodium and the like will be decreased. In addition, when the concentration is 0.05 mol/L or more, an effect for removing these impurities will not be changed. Therefore, when an excess amount of an ammonium hydrogen carbonate (an ammonium bicarbonate) is added, a cost will be increased, and also, there will be an effect on an environmental load such as an effluent standard, so it is preferable to set an upper limit of the concentration to about 1.0 mol/L.

In addition, it is not necessary to adjust a pH of an ammonium hydrogen carbonate particularly when the concentration is 0.05 mol/L or more, and it is fine with a pH in a course of an event. For instance, when the concentration is from 0.05 to 1.0 mol/L, its pH will be in a range of about 8.0 to 9.0.

[Liquid Temperature]

A liquid temperature of an ammonium hydrogen carbonate which is a washing liquid is not limited particularly, but it is preferably 15 to 50 degrees Celsius. When the liquid temperature is within the above range, a substitution reaction with impurities and a foaming effect of a carbonate gas generated from an ammonium hydrogen carbonate will be excellent, and a removal of impurities proceeds efficiently.

[Liquid Amount]

A liquid amount of an ammonium hydrogen carbonate is preferably 1 to 20 L with respect to 1 kg of a nickel manganese cobalt composite hydroxide (as a slurry concentration, it is 50 to 1000 g/L). When the liquid amount is less than 1 L, an effect for removing impurities may not be obtained sufficiently. In addition, even when the liquid amount of more than 20 L is used, an effect for removing impurities will not be changed, but with an excessive liquid amount, a cost will be increased, and there will be an effect on an environmental load such as an effluent standard, and also, it will be a cause of an increase in a load of a drainage volume in a waste water treatment.

[Washing Time]

A washing time by an ammonium hydrogen carbonate is not limited particularly, as long as impurities are removed sufficiently, but normally, it is 0.5 to 2 hours.

[Washing Method]

As a washing method, 1) a general washing method to filter after performing a stirring washing a slurry formed by adding a nickel manganese cobalt composite hydroxide to an ammonium hydrogen carbonate solution, or 2) a liquid passing washing for passing through an ammonium hydrogen carbonate solution by supplying a slurry containing a nickel manganese cobalt composite hydroxide generated by a neutralization crystallization to a filter such as a filter press, can be performed. The liquid passing washing is more preferable as it is having a high effect for removing impurities and a high productivity, and as it is capable of performing a filtering and a washing in a same equipment continuously.

In addition, after washing by an ammonium hydrogen carbonate solution, there is a case that a washing liquid containing impurities washed out by a substitution reaction is adhering to a nickel manganese cobalt composite hydroxide, so it is preferable to wash with a water at last. Further, after washed with a water, it is preferable to perform a drying process (unillustrated) for drying a water adhered to a filtered nickel manganese cobalt composite hydroxide.

A nickel manganese cobalt composite hydroxide obtained via the washing process S20 is a nickel manganese cobalt composite hydroxide, which is a precursor of a positive electrode active material, and which is composed of secondary particles to which primary particles containing a nickel, a manganese, and a cobalt are aggregated, or composed of the primary particles and the secondary particles, wherein a sodium content contained in the nickel manganese cobalt composite hydroxide is less than 0.0005% by mass, and a void ratio of particles of the nickel manganese cobalt composite hydroxide is 20% to 50%.

According to a method for producing a nickel manganese cobalt composite hydroxide relating to one embodiment of the present invention, it is possible to provide a method for producing a nickel manganese cobalt composite hydroxide, which is a precursor of a positive electrode active material of a lithium ion secondary battery capable of further improving a battery characteristic, and also, capable of surely decreasing a sodium content especially.

<4. Lithium Ion Secondary Battery>

A lithium ion secondary battery relating to one embodiment of the present invention is characterized in that it is having a positive electrode containing the lithium nickel manganese cobalt composite oxide. In addition, the lithium ion secondary battery may be composed by components similar to a general lithium ion secondary battery, and for example, it contains a positive electrode, a negative electrode, and a non-aqueous electrolyte. In addition, an embodiment explained in below is only an example, and a lithium ion secondary battery of the present embodiment can be performed in forms with various modifications and improvements based on a knowledge of a person skilled in the art, based on the embodiment described in the present description. In addition, an intended use of a lithium ion secondary battery of the present embodiment is not limited particularly.

(a) Positive Electrode

A positive electrode of a lithium ion secondary battery is produced, for example as below, by using the above-mentioned lithium nickel manganese cobalt composite oxide which is a positive electrode active material. At first, a powdery positive electrode active material, a conductive material, and a binding agent are mixed, and according to need, an activated carbon or a solvent intended to control a viscosity are added, and these materials are kneaded to produce a positive electrode mixture paste. A mixing ratio of each component in the positive electrode mixture paste is similar to which of a positive electrode of a general lithium ion secondary battery, and for example, when a total mass of a solid content in the positive electrode mixture paste excluding a solvent is 100 mass parts, a content of the positive electrode active material is preferably 60 to 95 mass parts, a content of the conductive material is preferably 1 to 20 mass parts, and a content of the binding agent is preferably 1 to 20 mass parts.

The obtained positive electrode mixture paste is applied, for example on a surface of a current collector made of an aluminum foil, and dried to scatter the solvent. In addition, it may be pressed by a roll press device or the like, in order to increase an electrode density according to need. In this way, a sheet-like positive electrode can be produced. The sheet-like positive electrode can be used for a production of a battery by cutting or the like into an appropriate size according to an aimed battery. However, a method for producing the positive electrode is not limited to the above exemplified method, and other method may be used.

As the conductive material, for example a graphite (natural graphite, artificial graphite, expanded graphite, or the like), or a carbon black material such as an acetylene black or a Ketjen black, may be used.

The binding agent serves a function to bind active material particles, and for example, a polyvinylidene fluoride (PVDF), a polytetrafluoroethylene (PTFE), a fluororubber, an ethylene propylene diene rubber, a styrene butadiene, a cellulose resin, a polyacrylic acid or the like, may be used as the binding agent.

In addition, according to need, a solvent for dissolving the binding agent can be added to a positive electrode mixture to disperse the positive electrode active material, the conductive material, and an activated carbon. As the solvent, an organic solvent such as N-methyl-2-pyrrolidone can be used concretely. In addition, the activated carbon can be added to the positive electrode mixture, in order to increase an electric double layer capacity.

(b) Negative Electrode

As a negative electrode, a metal lithium, a lithium alloy, or the like, or a negative electrode mixture may be used. A negative electrode mixture paste is prepared by mixing the binding agent to a negative electrode active material capable of an insertion and a deinsertion of lithium ions, and by adding an appropriate solvent, and the negative electrode mixture paste is applied on a surface of a metal foil current collector such as a copper, and dried, and compressed to increase an electrode density according to need to form the negative electrode mixture to be used.

As the negative electrode active material, for example, an organic compound fired body such as a natural graphite, an artificial graphite and a phenol resin, and a powder body of a carbon material such as a coke may be used. In this case, as the binding agent for the negative electrode, a fluorine-containing resin such as a PVDF may be used as well as the positive electrode, and as a solvent for dispersing these active material and binding agent, an organic solvent such as N-methyl-2-pyrrolidone may be used.

(c) Separator

A separator is arranged to be interposed between the positive electrode and the negative electrode. The separator retains an electrolyte by separating the positive electrode and the negative electrode, and for example, a thin film of a polyethylene, a polypropylene or the like having numerous fine holes may be used.

(d) Non-Aqueous Electrolyte

As a non-aqueous electrolyte, a non-aqueous electrolyte solution may be used. As the non-aqueous electrolyte solution, an electrolyte solution in which a lithium salt is dissolved in an organic solvent as a supporting salt may be used. Also, as the non-aqueous electrolyte solution, an electrolyte solution in which a lithium salt is dissolved in an ionic liquid may be used. In addition, the ionic liquid is composed of cations and anions other than a lithium ion, and which is a salt in a form of a liquid in a normal temperature.

As the organic solvent, it is possible to use one kind solely or by mixing two kinds or more selected from: a cyclic carbonate such as an ethylene carbonate, a propylene carbonate, a butylene carbonate, and a trifluoro propylene carbonate; a chain carbonate such as a diethyl carbonate, a dimethyl carbonate, an ethyl methyl carbonate, and a dipropyl carbonate; an ether compound such as a tetrahydrofuran, a 2-methyl tetrahydrofuran, and a dimethoxyethane; a sulfur compound such as an ethyl methyl sulfone and a butane sultone; and a phosphor compound such as a triethyl phosphate and a trioctyl phosphate.

As the supporting salt, $LiPF_6$, $LiBF_4$, $LiClO_4$, $LiAsF_6$, $LiN(CF_3SO_2)_2$ and a combined salt thereof may be used. Further, the non-aqueous electrolyte solution may contain a radical scavenger, a surfactant, a flame retardant or the like.

In addition, as the non-aqueous electrolyte, a solid electrolyte may be used. The solid electrolyte is having a characteristic to resist a high voltage. As the solid electrolyte, inorganic solid electrolyte and organic solid electrolyte may be cited.

As the inorganic solid electrolyte, an oxide-based solid electrolyte, a sulfide-based solid electrolyte or the like may be used.

As the oxide-based solid electrolyte, it is not limited particularly, and any solid electrolyte may be used as long as it contains an oxygen (O), and also, it is having a lithium ion conductivity and an electron insulating property. As the oxide-based solid electrolyte, for example, a lithium phosphate ($Li_3PO_4$), $Li_3PO_4N_x$, $LiBO_2N_x$, $LiNbO_3$, $LiTaO_3$, $Li_2SiO_3$, $Li_4SiO_4$—$Li_3PO_4$, $Li_4SiO_4$—$Li_3VO_4$, $Li_2O$—

$B_2O_3$—$P_2O_5$, $Li_2O$—$SiO_2$, $Li_2O$—$B_2O_3$—$ZnO$, $Li_{1+x}$ $Al_xTi_{2-x}(PO_4)_3$ ($0 \leq x \leq 1$), $Li_{1+x}Al_xGe_{2-x}(PO_4)_3$ ($0 \leq x \leq 1$), $LiTi_2(PO_4)_3$, $Li_{3x}La_{2/3-x}TiO_3$ ($0 \leq x \leq \frac{2}{3}$), $Li_5La_3Ta_2O_{12}$, $Li_7La_3Zr_2O_{12}$, $Li_6BaLa_2Ta_2O_{12}$, $Li_{3.6}Si_{0.6}P_{0.4}O_4$, or the like may be cited.

As the sulfide-based solid electrolyte, it is not limited particularly, and any solid electrolyte may be used as long as it contains a sulfur (S), and also, it is having a lithium ion conductivity and an electron insulating property. As the sulfide-based solid electrolyte, for example, $Li_2S$—$P_2S_5$, $Li_2S$—$SiS_2$, $LiI$—$Li_2S$—$SiS_2$, $LiI$-$Li_2S$—$P_2S_5$, $LiI$-$Li_2S$—$B_2S_3$, $Li_3PO_4$—$Li_2S$—$SiS$, $LiI$-$Li_2S$—$P_2O_5$, $LiI$-$Li_3PO_4$—$P_2S_5$, or the like may be cited.

In addition, as the inorganic solid electrolyte, a solid electrolyte other than the above solid electrolyte may be used, and for example, $Li_3N$, $LiI$, $Li_3N$-$LiI$-$LiOH$, or the like may be used.

As the organic solid electrolyte, it is not limited particularly, as long as it is a polymer compound having an ion conductivity, and for example, a polyethylene oxide, a polypropylene oxide, a copolymer thereof, or the like may be used. In addition, the organic solid electrolyte may comprise the supporting salt (lithium salt).

(e) Structure and Shape of Battery

A lithium ion secondary battery relating to one embodiment of the present invention is composed, for example by the positive electrode, the negative electrode, the separator and the non-aqueous electrolyte. In addition, a shape of the lithium ion secondary battery is not limited particularly, and it may be formed in various shapes such as a cylindrical shape or a layered shape. Even when the lithium ion secondary battery is adopting any shape, the positive electrode and the negative electrode are laminated via the separator to form an electrode body, and the obtained electrode body is impregnated with the non-aqueous electrolyte, and a positive electrode current collector and a positive electrode terminal communicating to outside, and also, a negative electrode current collector and a negative electrode terminal communicating to outside are connected using a current collecting lead or the like, and sealed in a battery case to complete the lithium ion secondary battery.

A lithium ion secondary battery relating to one embodiment of the present invention is capable of further improving a battery characteristic with an increased void ratio, and also, capable of inhibiting an aggregation by sintering and surely decreasing a sodium content especially, by comprising a positive electrode composed of the above positive electrode active material.

EXAMPLES

Next, explaining in detail by examples about a nickel manganese cobalt composite hydroxide relating to one embodiment of the present invention, and a method for producing the nickel manganese cobalt composite hydroxide, a lithium nickel manganese cobalt composite oxide, and a lithium ion secondary battery. In addition, the present invention is not limited to these examples.

A transition metal composite hydroxide obtained in a crystallization process described in each of Examples 1 to 13 and Comparative Examples 1 to 9 was collected as a nickel manganese cobalt composite hydroxide which is a precursor, via a washing, filtering, and drying operation, and then, the nickel manganese cobalt composite hydroxide was subjected to various analyses by following methods.

[Composition, Calcium and Magnesium Content]

A composition, calcium and magnesium content were analyzed by an acid decomposition—ICP emission spectrometry, and an ICPE-9000 (manufactured by SHIMADZU CORPORATION), which is a multiple ICP emission spectrometer, was used for a measurement.

[Sodium and Potassium Content]

A sodium and potassium content were analyzed by an acid decomposition—atomic absorption spectrometry, and an atomic absorption spectrometer 240AA (manufactured by Agilent Technologies, Inc.), which is an atomic absorption spectrometer, was used for a measurement.

[Sulfate Radical Content]

A sulfate radical content was determined by analyzing a total sulfur content by an acid decomposition—ICP emission spectrometry, and by converting this total sulfur content to a sulfate radical ($SO_4^{2-}$). In addition, an ICPE-9000 (manufactured by SHIMADZU CORPORATION), which is a multiple ICP emission spectrometer, was used for a measurement.

[Chloride Radical Content]

A chloride radical content was analyzed by an X-ray fluorescence (XRF) analysis, by analyzing a sample directly, or by analyzing a chloride radical contained in a distillation operation by separating a chloride radical in a form of a silver chloride. In addition, an Axios (manufactured by Spectris Co., Ltd.), which is an X-ray fluorescence spectrometer, was used for a measurement.

[Average Particle Size and Particle Size Distribution]

An average particle size (MV) and a particle size distribution [(d90−d10)/average particle size] were determined from a volume-based distribution measured by using a laser diffraction scattering method. In addition, a Microtrac MT3300EXII (manufactured by MicrotracBEL Corp.), which is a laser diffraction scattering particle size distribution measuring device, was used for a measurement.

[Specific Surface Area]

A specific surface area was analyzed by a nitrogen gas adsorption and desorption method by a BET one-point method, and a Macsorb 1200 series (manufactured by MOUNTECH Co., Ltd.), which is a specific surface area measuring device, was used for a measurement.

[Void Ratio]

Regarding a void ratio, a cross-section polisher IB-19530CP (manufactured by JEOL Ltd.), which is a cross-section adjustment device, was used for cutting particles of a sample, and a JSM-7001F (manufactured by JEOL Ltd.), which is a Schottky field emission scanning electron microscope SEM-EDS, was used for observing its cross section. Further, a void ratio was determined by using WinRoof 6.1.1 (manufactured by MITANI CORPORATION), which is an image analysis and measurement software, by measuring voids in the cross section of the particles as black, and also, by measuring dense parts of the particles as white, and by calculating an area of a black part divided by (a black part+a white part) with respect to optional 20 or more particles.

[Production and Evaluation of Positive Electrode Active Material]

In addition, a lithium metal composite oxide, more concretely, a lithium nickel manganese cobalt composite oxide, which is a positive electrode active material made from the nickel manganese cobalt composite hydroxide of the present invention, was produced and evaluated by a following method.

[A. Production of Positive Electrode Active Material]

A nickel manganese cobalt composite hydroxide, which is a precursor, was heat-treated in an air flow (oxygen: 21 vol %) at 700 degrees Celsius for 6 hours, and a metal composite oxide was collected. Then, a lithium hydroxide, which is a lithium compound, was weighed such that a ratio of Li/Me was 1.025, and was mixed with the collected metal composite oxide to prepare a lithium mixture. In addition, a mixing operation was performed by using a shaker mixer (TURBULA TypeT2C manufactured by Willy A Bachofen (WAB)).

Then, the prepared lithium mixture was subjected to a calcination at 500 degrees Celsius for 4 hours and then fired at 730 degrees Celsius for 24 hours in an oxygen flow (oxygen: 100% by volume), cooled, and then disintegrated to obtain a lithium nickel manganese cobalt composite oxide.

[B. Evaluation of Positive Electrode Active Material]

In the obtained lithium nickel manganese cobalt composite oxide, a sodium content, a potassium content, a calcium content, a magnesium content, a sulfate radical content, a chloride radical content, and a void ratio were analyzed by using the above analysis methods and analysis devices. In addition, a Me site occupancy factor, which represents a crystallinity of the lithium nickel manganese cobalt composite oxide, was calculated by a Rietveld analysis of a diffraction pattern obtained using an X-ray diffractometer (XRD). In addition, an X-ray diffractometer X'Pert PRO (manufactured by Spectris Co. Ltd.) was used for a measurement. A Me site occupancy factor indicates a presence ratio of metal elements, i.e. a nickel, a manganese, a cobalt and an additive element M in the lithium nickel manganese cobalt composite oxide, occupied in a metal layer (Me site) of a layered structure. A Me site occupancy factor is correlated with a battery characteristic and it shows an excellent battery characteristic as a Me site occupancy factor is higher.

Hereinafter, explaining about each condition of examples and comparative examples.

Example 1

In Example 1, 0.9 L of a water was placed in a reaction tank (5 L) of a crystallization in a crystallization process, and a temperature in the reaction tank was set to 40 degrees Celsius while the water in the reaction tank was stirred.

Appropriate amounts of a 25% sodium hydroxide aqueous solution and a 25% ammonia water, which is an ammonium ion supplier, were added to the water in the reaction tank such that a pH of a reaction solution in the reaction tank was adjusted to 12.8 as a pH measured on the basis of a liquid temperature of 25 degrees Celsius. Further, a concentration of ammonium ions in the reaction solution was adjusted to 10 g/L.

Then, nickel sulfate, manganese sulfate, and cobalt chloride were dissolved in a water to prepare a 2.0 mol/L of a raw material solution. The raw material solution was adjusted such that a molar ratio of each metal element was Ni:Mn:Co=1:1:1. Further, a sodium hydroxide, which is an alkali metal hydroxide, and a sodium carbonate, which is a carbonate, were dissolved in a water such that $[CO_3^{2-}]/[OH^-]$ was 0.025 to prepare an alkaline solution.

The raw material solution was added to the reaction solution in the reaction tank at 12.9 mL/min. At the same time, the ammonium ion supplier and the alkaline solution were also added to the reaction solution in the reaction tank at constant rates such that a pH of the reaction solution was controlled to be 12.8 (pH in a nucleation process) while a concentration of ammonium ions in the reaction solution was maintained at 10 g/L. In this way, a nucleation was performed by performing a crystallization for 2 minutes 30 seconds.

Then, a 64% sulfuric acid was added until a pH of the reaction solution has reached 11.6 (pH in a particle growth process) as a pH measured on the basis of a liquid temperature of 25 degrees Celsius. Then, after a pH of the reaction solution has reached 11.6 as a pH measured on the basis of a liquid temperature of 25 degrees Celsius, a particle growth was performed by continuing a crystallization for 4 hours while controlling a pH at 11.6, by supplying the raw material solution, the ammonium ion supplier, and the alkaline solution again, to obtain a transition metal composite hydroxide.

In addition, regarding a reaction atmosphere, at first, an air atmosphere (oxygen concentration: 21% by volume) is contained in the reaction tank, and after maintaining it for 32 minutes from a start of a crystallization, a supply of the raw material solution, the ammonia water, and the alkaline solution was stopped temporarily, and a nitrogen gas was circulated at a flow rate of 5 L/min and substituted such that an oxygen concentration of a space in the reaction tank was 0.2% by volume or less, and the solutions were supplied again when the oxygen concentration was 0.2% by volume or less, and a crystallization was performed for 3.5 hours.

After a solid-liquid separation of the obtained transition metal composite hydroxide by a filter press filtration device, impurities were removed from the transition metal composite hydroxide by passing a washing liquid through the filter press filtration device in a proportion of 5 L of the washing liquid with respect to 1 kg of the transition metal composite hydroxide, by using an ammonium hydrogen carbonate solution with a concentration of 0.05 mol/L as the washing liquid, and then, it was further washed with a water by passing through a water. And, a water adhered to the washed transition metal composite hydroxide was dried to obtain a nickel manganese cobalt composite hydroxide, which is a precursor.

Example 2

In Example 2, a nickel manganese cobalt composite hydroxide was obtained in a same manner as in Example 1, except that a molar ratio of a nickel, a manganese, and a cobalt in the raw material solution was adjusted such that Ni:Mn:Co=6:2:2, when preparing 2.0 mol/L of the raw material solution by dissolving a nickel sulfate, a manganese sulfate, and a cobalt chloride in a water.

Example 3

In Example 3, a nickel manganese cobalt composite hydroxide was obtained in a same manner as in Example 1, except that a molar ratio of a nickel, a manganese, and a cobalt in the raw material solution was adjusted such that Ni:Mn:Co=2:7:1, when preparing 2.0 mol/L of the raw material solution by dissolving a nickel sulfate, a manganese sulfate, and a cobalt chloride in a water.

Example 4

In Example 4, a nickel manganese cobalt composite hydroxide was obtained in a same manner as in Example 1, except that the alkaline solution was prepared such that $[CO_3^{2-}]/[OH^-]$ was 0.003.

Example 5

In Example 5, a nickel manganese cobalt composite hydroxide was obtained in a same manner as in Example 1, except that the alkaline solution was prepared such that $[CO_3^{2-}]/[OH^-]$ was 0.048.

Example 6

In Example 6, a nickel manganese cobalt composite hydroxide was obtained in a same manner as in Example 1, except that a pH in the nucleation process was 13.6.

Example 7

In Example 7, a nickel manganese cobalt composite hydroxide was obtained in a same manner as in Example 1, except that a pH in the nucleation process was 12.3.

Example 8

In Example 8, a nickel manganese cobalt composite hydroxide was obtained in a same manner as in Example 1, except that a pH in the particle growth process was 11.8.

Example 9

In Example 9, a nickel manganese cobalt composite hydroxide was obtained in a same manner as in Example 1, except that a pH in the particle growth process was 10.6.

Example 10

In Example 10, a nickel manganese cobalt composite hydroxide was obtained in a same manner as in Example 1, except that the alkaline solution was prepared using a potassium hydroxide as an alkali metal hydroxide and a potassium carbonate as a carbonate.

Example 11

In Example 11, a nickel manganese cobalt composite hydroxide was obtained in a same manner as in Example 1, except that the alkaline solution was prepared using an ammonium carbonate as a carbonate, and that a concentration of ammonium ions was adjusted to 20 g/L.

Example 12

In Example 12, a nickel manganese cobalt composite hydroxide was obtained in a same manner as in Example 1, except that a temperature in the reaction tank was set to 35 degrees Celsius.

Example 13

In Example 13, a nickel manganese cobalt composite hydroxide was obtained in a same manner as in Example 1, except that an ammonium hydrogen carbonate solution with a concentration of 1.00 mol/L was used as the washing liquid.

Comparative Example 1

In Comparative Example 1, a nickel manganese cobalt composite hydroxide was obtained in a same manner as in Example 1, except that a molar ratio of a nickel, a manganese, and a cobalt in the raw material solution was adjusted such that Ni:Mn:Co=2:6:2, when preparing 2.0 mol/L of the raw material solution by dissolving a nickel sulfate, a manganese sulfate, and a cobalt chloride in a water, and that the alkaline solution was prepared such that $[CO_3^{2-}]/[OH^-]$ was 0.001.

Comparative Example 2

In Comparative Example 2, a nickel manganese cobalt composite hydroxide was obtained in a same manner as in Example 1, except that the alkaline solution was prepared using only a sodium hydroxide, and that $[CO_3^{2-}]/[OH^-]$ was not considered.

Comparative Example 3

In Comparative Example 3, a nickel manganese cobalt composite hydroxide was obtained in a same manner as in Example 1, except that the alkaline solution was prepared such that $[CO_3^{2-}]/[OH^-]$ was 0.001.

Comparative Example 4

In Comparative Example 4, a nickel manganese cobalt composite hydroxide was obtained in a same manner as in Example 1, except that the alkaline solution was prepared such that $[CO_3^{2-}]/[OH^-]$ was 0.055.

Comparative Example 5

In Comparative Example 5, a nickel manganese cobalt composite hydroxide was obtained in a same manner as in Example 1, except that the washing process was omitted so that a washing by an ammonium hydrogen carbonate solution was not performed.

Comparative Example 6

In Comparative Example 6, a nickel manganese cobalt composite hydroxide was obtained in a same manner as in Example 1, except that an ammonium hydrogen carbonate solution with a concentration of 0.02 mol/L was used as the washing liquid.

Comparative Example 7

In Comparative Example 7, a nickel manganese cobalt composite hydroxide was obtained in a same manner as in Example 1, except that an ammonium carbonate solution was used as the washing liquid.

Comparative Example 8

In Comparative Example 8, a nickel manganese cobalt composite hydroxide was obtained in a same manner as in Example 1, except that a sodium hydrogen carbonate solution was used as the washing liquid.

Comparative Example 9

In Comparative Example 9, a nickel manganese cobalt composite hydroxide was obtained in a same manner as in Example 1, except that a sodium carbonate solution was used as the washing liquid.

The above conditions and results are indicated in Table 1, Table 2, and Table 3.

TABLE 1

| | Nickel manganese cobalt composite hydroxide (precursor) | | | | | | | | | | |
| | Crystallization process | | | | | | | | | Washing process | |
| | | | | | Total time | | | | | | |
| | Ni:Mn: Co | [CO$_3$$^{2-}$]/ [OH$^-$] | Nucleation pH | Particle growth pH | of air atmosphere crystalli- zation (min) | Alkali metal hydroxide | Carbonate | Ammonium ion concen- tration (g/L) | Reaction temper- ature (° C.) | Type of washing liquid | Concen- tration of washing liquid (mol/L) |
|---|---|---|---|---|---|---|---|---|---|---|---|
| Example 1 | 1:1:1 | 0.025 | 12.8 | 11.6 | 32 | Sodium hydroxide | Sodium carbonate | 10 | 40 | Ammonium hydrogen carbonate | 0.05 |
| Example 2 | 6:2:2 | 0.025 | 12.8 | 11.6 | 32 | Sodium hydroxide | Sodium carbonate | 10 | 40 | Ammonium hydrogen carbonate | 0.05 |
| Example 3 | 2:7:1 | 0.025 | 12.8 | 11.6 | 32 | Sodium hydroxide | Sodium carbonate | 10 | 40 | Ammonium hydrogen carbonate | 0.05 |
| Example 4 | 1:1:1 | 0.003 | 12.8 | 11.6 | 32 | Sodium hydroxide | Sodium carbonate | 10 | 40 | Ammonium hydrogen carbonate | 0.05 |
| Example 5 | 1:1:1 | 0.048 | 12.8 | 11.6 | 32 | Sodium hydroxide | Sodium carbonate | 10 | 40 | Ammonium hydrogen carbonate | 0.05 |
| Example 6 | 1:1:1 | 0.025 | 13.6 | 11.6 | 32 | Sodium hydroxide | Sodium carbonate | 10 | 40 | Ammonium hydrogen carbonate | 0.05 |
| Example 7 | 1:1:1 | 0.025 | 12.3 | 11.6 | 32 | Sodium hydroxide | Sodium carbonate | 10 | 40 | Ammonium hydrogen carbonate | 0.05 |
| Example 8 | 1:1:1 | 0.025 | 12.8 | 11.8 | 32 | Sodium hydroxide | Sodium carbonate | 10 | 40 | Ammonium hydrogen carbonate | 0.05 |
| Example 9 | 1:1:1 | 0.025 | 12.8 | 10.6 | 32 | Sodium hydroxide | Sodium carbonate | 10 | 40 | Ammonium hydrogen carbonate | 0.05 |
| Example 10 | 1:1:1 | 0.025 | 12.8 | 11.6 | 32 | Potassium hydroxide | Potassium carbonate | 10 | 40 | Ammonium hydrogen carbonate | 0.05 |
| Example 11 | 1:1:1 | 0.025 | 12.8 | 11.6 | 32 | Sodium hydroxide | Ammonium carbonate | 20 | 40 | Ammonium hydrogen carbonate | 0.05 |
| Example 12 | 1:1:1 | 0.025 | 12.8 | 11.6 | 32 | Sodium hydroxide | Sodium carbonate | 10 | 35 | Ammonium hydrogen carbonate | 0.05 |
| Example 13 | 1:1:1 | 0.025 | 12.8 | 11.6 | 32 | Sodium hydroxide | Sodium carbonate | 10 | 40 | Ammonium hydrogen carbonate | 1.00 |
| Comparative example 1 | 2:6:2 | 0.001 | 12.8 | 11.6 | 32 | Sodium hydroxide | Sodium carbonate | 10 | 40 | Ammonium hydrogen carbonate | 0.05 |
| Comparative example 2 | 1:1:1 | — | 12.8 | 11.6 | 32 | Sodium hydroxide | — | 10 | 40 | Ammonium hydrogen carbonate | 0.05 |
| Comparative example 3 | 1:1:1 | 0.001 | 12.8 | 11.6 | 32 | Sodium hydroxide | Sodium carbonate | 10 | 40 | Ammonium hydrogen carbonate | 0.05 |
| Comparative example 4 | 1:1:1 | 0.055 | 12.8 | 11.6 | 32 | Sodium hydroxide | Sodium carbonate | 10 | 40 | Ammonium hydrogen carbonate | 0.05 |
| Comparative example 5 | 1:1:1 | 0.025 | 12.8 | 11.6 | 32 | Sodium hydroxide | Sodium carbonate | 10 | 40 | — | — |
| Comparative example 6 | 1:1:1 | 0.025 | 12.8 | 11.6 | 32 | Sodium hydroxide | Sodium carbonate | 10 | 40 | Ammonium hydrogen carbonate | 0.02 |
| Comparative example 7 | 1:1:1 | 0.025 | 12.8 | 11.6 | 32 | Sodium hydroxide | Sodium carbonate | 10 | 40 | Ammonium carbonate | 0.05 |
| Comparative example 8 | 1:1:1 | 0.025 | 12.8 | 11.6 | 32 | Sodium hydroxide | Sodium carbonate | 10 | 40 | Sodium hydrogen carbonate | 0.05 |
| Comparative example 9 | 1:1:1 | 0.025 | 12.8 | 11.6 | 32 | Sodium hydroxide | Sodium carbonate | 10 | 40 | Sodium carbonate | 0.05 |

Nickel manganese cobalt composite hydroxide (precursor)

| | Sodium (% by mass) | Potassium (% by mass) | Calcium (% by mass) | Magnesium (% by mass) | Sulphate radical (% by mass) | Chloride radical (% by mass) | Average particle size MV (μm) | (d90-d10)/average particle size MV | Specific surface area (m²/g) | Void ratio (%) |
|---|---|---|---|---|---|---|---|---|---|---|
| Example 1 | <0.0005 | <0.0005 | <0.0005 | <0.0005 | 0.17 | 0.007 | 6.8 | 0.50 | 37 | 45 |
| Example 2 | <0.0005 | <0.0005 | <0.0005 | <0.0005 | 0.17 | 0.008 | 6.7 | 0.49 | 38 | 50 |
| Example 3 | <0.0005 | <0.0005 | <0.0005 | <0.0005 | 0.17 | 0.008 | 6.9 | 0.51 | 36 | 39 |
| Example 4 | <0.0005 | <0.0005 | <0.0005 | <0.0005 | 0.19 | 0.009 | 7.0 | 0.50 | 35 | 41 |
| Example 5 | <0.0005 | <0.0005 | <0.0005 | <0.0005 | 0.19 | 0.009 | 7.1 | 0.48 | 33 | 35 |
| Example 6 | <0.0005 | <0.0005 | <0.0005 | <0.0005 | 0.18 | 0.009 | 7.0 | 0.52 | 34 | 36 |
| Example 7 | <0.0005 | <0.0005 | <0.0005 | <0.0005 | 0.18 | 0.008 | 6.9 | 0.50 | 37 | 33 |
| Example 8 | <0.0005 | <0.0005 | <0.0005 | <0.0005 | 0.18 | 0.008 | 6.8 | 0.51 | 39 | 30 |
| Example 9 | <0.0005 | <0.0005 | <0.0005 | <0.0005 | 0.18 | 0.009 | 7.0 | 0.53 | 34 | 28 |
| Example 10 | <0.0005 | <0.0005 | <0.0005 | <0.0005 | 0.18 | 0.007 | 7.1 | 0.49 | 32 | 24 |
| Example 11 | <0.0005 | <0.0005 | <0.0005 | <0.0005 | 0.18 | 0.007 | 7.2 | 0.50 | 30 | 20 |
| Example 12 | <0.0005 | <0.0005 | <0.0005 | <0.0005 | 0.18 | 0.007 | 6.8 | 0.53 | 37 | 42 |
| Example 13 | <0.0005 | <0.0005 | <0.0005 | <0.0005 | 0.17 | 0.008 | 6.7 | 0.50 | 40 | 48 |
| Comparative example 1 | 0.0010 | <0.0005 | <0.0005 | <0.0005 | 0.28 | 0.016 | 7.0 | 0.58 | 35 | 26 |
| Comparative example 2 | 0.0016 | <0.0005 | <0.0005 | <0.0005 | 0.32 | 0.018 | 7.1 | 0.57 | 33 | 33 |
| Comparative example 3 | 0.0013 | <0.0005 | <0.0005 | <0.0005 | 0.30 | 0.018 | 7.0 | 0.57 | 34 | 40 |
| Comparative example 4 | 0.0013 | <0.0005 | <0.0005 | <0.0005 | 0.28 | 0.018 | 6.7 | 0.59 | 39 | 47 |
| Comparative example 5 | 0.3400 | <0.0005 | <0.0005 | <0.0005 | 0.45 | 0.160 | 6.9 | 0.53 | 38 | 44 |
| Comparative example 6 | 0.0008 | <0.0005 | <0.0005 | <0.0005 | 0.24 | 0.013 | 7.0 | 0.51 | 36 | 31 |
| Comparative example 7 | 0.0020 | <0.0005 | <0.0005 | <0.0005 | 0.24 | 0.013 | 7.0 | 0.51 | 35 | 23 |
| Comparative example 8 | 0.0250 | 0.0010 | 0.0023 | 0.0011 | 0.28 | 0.016 | 7.0 | 0.50 | 37 | 35 |
| Comparative example 9 | 0.0400 | 0.0014 | 0.0027 | 0.0014 | 0.31 | 0.016 | 6.8 | 0.50 | 39 | 45 |

Lithium nickel manganese cobalt composite oxide (positive electrode active material)

| | Sodium (% by mass) | Potassium (% by mass) | Calcium (% by mass) | Magnesium (% by mass) | Sulphate radical (% by mass) | Chloride radical (% by mass) | Average particle size MV (μm) | MV ratio | Aggregation of secondary particles (%) | Me site occupancy factor (%) | Void ratio (%) |
|---|---|---|---|---|---|---|---|---|---|---|---|
| Example 1 | <0.0005 | <0.0005 | <0.0005 | <0.0005 | 0.14 | 0.002 | 6.8 | 1.00 | 3 | 93.1 | 46 |
| Example 2 | <0.0005 | <0.0005 | <0.0005 | <0.0005 | 0.13 | 0.003 | 6.9 | 1.03 | 4 | 93.1 | 50 |
| Example 3 | <0.0005 | <0.0005 | <0.0005 | <0.0005 | 0.13 | 0.002 | 6.9 | 1.00 | 3 | 93.2 | 38 |
| Example 4 | <0.0005 | <0.0005 | <0.0005 | <0.0005 | 0.15 | 0.004 | 6.8 | 0.97 | 2 | 93.2 | 40 |
| Example 5 | <0.0005 | <0.0005 | <0.0005 | <0.0005 | 0.15 | 0.003 | 7.0 | 0.99 | 3 | 93.1 | 37 |
| Example 6 | <0.0005 | <0.0005 | <0.0005 | <0.0005 | 0.15 | 0.003 | 7.1 | 1.01 | 4 | 93.2 | 35 |
| Example 7 | <0.0005 | <0.0005 | <0.0005 | <0.0005 | 0.15 | 0.003 | 7.1 | 1.03 | 4 | 93.2 | 35 |
| Example 8 | <0.0005 | <0.0005 | <0.0005 | <0.0005 | 0.14 | 0.003 | 6.8 | 1.00 | 3 | 93.1 | 32 |
| Example 9 | <0.0005 | <0.0005 | <0.0005 | <0.0005 | 0.14 | 0.003 | 7.0 | 1.00 | 3 | 93.1 | 30 |
| Example 10 | <0.0005 | <0.0005 | <0.0005 | <0.0005 | 0.14 | 0.002 | 7.1 | 1.00 | 3 | 93.3 | 20 |
| Example 11 | <0.0005 | <0.0005 | <0.0005 | <0.0005 | 0.14 | 0.002 | 7.0 | 0.97 | 2 | 93.3 | 22 |
| Example 12 | <0.0005 | <0.0005 | <0.0005 | <0.0005 | 0.15 | 0.002 | 6.8 | 1.00 | 3 | 93.1 | 46 |
| Example 13 | <0.0005 | <0.0005 | <0.0005 | <0.0005 | 0.13 | 0.003 | 6.8 | 1.01 | 4 | 93.3 | 46 |
| Comparative example 1 | 0.0009 | <0.0005 | <0.0005 | <0.0005 | 0.23 | 0.008 | 7.4 | 1.06 | 6 | 88.8 | 25 |
| Comparative example 2 | 0.0014 | <0.0005 | <0.0005 | <0.0005 | 0.23 | 0.008 | 7.5 | 1.06 | 7 | 89.1 | 30 |
| Comparative example 3 | 0.0012 | <0.0005 | <0.0005 | <0.0005 | 0.22 | 0.009 | 7.4 | 1.06 | 7 | 89.1 | 38 |
| Comparative example 4 | 0.0011 | <0.0005 | <0.0005 | <0.0005 | 0.22 | 0.009 | 7.1 | 1.06 | 7 | 89.0 | 45 |
| Comparative example 5 | 0.3300 | <0.0005 | <0.0005 | <0.0005 | 0.28 | 0.052 | 7.5 | 1.09 | 10 | 92.0 | 45 |
| Comparative example 6 | 0.0007 | <0.0005 | <0.0005 | <0.0005 | 0.13 | 0.009 | 7.4 | 1.06 | 6 | 92.2 | 33 |
| Comparative example 7 | 0.0019 | <0.0005 | <0.0005 | <0.0005 | 0.12 | 0.009 | 7.4 | 1.06 | 7 | 92.5 | 26 |
| Comparative example 8 | 0.0240 | 0.0007 | 0.0015 | 0.0009 | 0.15 | 0.013 | 7.5 | 1.07 | 8 | 91.9 | 38 |

-continued

| Lithium nickel manganese cobalt composite oxide (positive electrode active material) | | | | | | | | | | |
|---|---|---|---|---|---|---|---|---|---|---|
| Sodium (% by mass) | Potassium (% by mass) | Calcium (% by mass) | Magnesium (% by mass) | Sulphate radical (% by mass) | Chloride radical (% by mass) | Average particle size MV (μm) | MV ratio | Aggregation of secondary particles (%) | Me site occupancy factor (%) | Void ratio (%) |
| Comparative example 9 | | | | | | | | | | |
| 0.0380 | 0.0011 | 0.0018 | 0.0010 | 0.15 | 0.008 | 7.3 | 1.07 | 8 | 92.3 | 42 |

(Comprehensive Evaluation)

As indicated in Table 1, Table 2, and Table 3, in the nickel manganese cobalt composite hydroxide, which is a precursor, of Examples 1 to 13, all conditions of the crystallization process and the washing process were all in a preferable range. Therefore, not only the nickel manganese cobalt composite hydroxide, but also in the lithium nickel manganese cobalt composite oxide, which is a positive electrode active material, with respect to a removal of impurities, a potassium content, a calcium content, and a magnesium content, in addition to a sulfate radical content and a chloride radical content, including a sodium content, were decreased sufficiently. Further, in the lithium nickel manganese cobalt composite oxide, a Me site occupancy factor was more than 93.0%, and also resulted as excellent in a crystallinity, and a battery characteristic was improved.

Especially, regarding a sodium content, both of the precursor and the positive electrode active material showed an extremely excellent results that a data of all examples were less than a quantitative (analysis) lower limit (0.0005% by mass). In addition, also regarding a potassium, a calcium, and a magnesium, similar results as a sodium were obtained. Therefore, in the positive electrode active material, a sodium or the like were not solid-solving in a lithium site, and a MV ratio, which is an index of an aggregation by sintering, was in a range of 0.95 to 1.05, and further, when observing 100 or more particles selected randomly by a scanning electron microscope, a number that an aggregation of secondary particles is observed was 5% or less with respect to a total number of observed secondary particles.

Here, a quantitative lower limit means a minimum quantity or a minimum concentration capable of an analysis (quantitation) of a target component by a certain analysis method. In addition, a minimum amount (value) capable of a signal detection of a target component in a measurement is called a detection limit, and a minimum amount (value) to secure a reliability in a signal of a target component obtained by a measurement is called a measurement lower limit. Further, in a process of preparing an analysis sample into a measurement specimen liquid, a quantitative lower limit is determined by multiplying a measurement lower limit by a dilution magnification indicating how much condensed or diluted from the original analysis sample.

In other words, for example, in a sodium content and a potassium content of the present invention, 100 mL of a measurement specimen liquid was prepared (dilution magnification is 100 times) by acid-decomposing 1 g of an analysis sample with respect to a measurement lower limit 0.05 μg/mL of an atomic absorption spectrometer, so a quantitative lower limit is 5 ppm (μg/g), i.e. 0.0005% by mass. In addition, in a calcium content and a magnesium content of the present invention, 100 mL of a measurement specimen liquid was prepared (dilution magnification is 100 times) by acid-decomposing 1 g of an analysis sample with respect to a measurement lower limit 0.05 μg/mL of an ICP emission spectrometer, so a quantitative lower limit is 5 ppm (μg/g), i.e. 0.0005% by mass.

On the other hand, in Comparative Examples 1 to 9, $[CO_3^{2-}]/[OH^-]$ when preparing the alkaline solution, or a concentration of the ammonium hydrogen carbonate solution, which is the washing liquid, were not in a preferable range, or a washing liquid other than the ammonium hydrogen carbonate solution was used, and it was deviated from optimum conditions, so an excellent effect like the examples were not obtained.

In addition, in Examples 1 to 13, regarding a hollow structure of the lithium nickel manganese cobalt composite oxide, including the nickel manganese cobalt composite hydroxide, a void ratio is in a preferable range of 20% to 50%, so when used as the positive electrode active material, a battery characteristic is improved as a contact area of the positive electrode active material and the electrolyte solution will be sufficient, while maintaining a particle strength within an allowable range, without excessively decreasing a bulk density of the positive electrode active material.

From the above, it is possible to provide a nickel manganese cobalt composite hydroxide, which is a precursor of a positive electrode active material of a lithium ion secondary battery capable of further improving a battery characteristic, and also, capable of surely decreasing a sodium content especially, a method for producing the nickel manganese cobalt composite hydroxide, a lithium nickel manganese cobalt composite oxide, and a lithium ion secondary battery. In addition, it is possible to provide a lithium nickel manganese cobalt composite oxide, which is a positive electrode active material inhibiting an aggregation by sintering, manufactured by using the nickel manganese cobalt composite hydroxide in which a sodium content is surely decreased, and a lithium ion secondary battery.

By the way, for example, in a field of analytical chemistry, a reagent manufacturer providing a standard substance to be a standard of an analysis and a test is working on a further high purification of the standard substance every day, and a research for decreasing impurities to the utmost have been conducted. For this reason, it is obvious that the lithium nickel manganese cobalt composite oxide, in which a content of impurities including a sodium is decreased as possible, is not a matter only changing a designing matter.

In addition, it was explained in detail about each embodiment and each example of the present invention as the above, but it is easy for those who skilled in the art to understand that various modifications are possible without substantially departing from new matters and effects of the present invention. Therefore, all of such modified examples are included within the scope of the present invention.

For example, a term used at least once in the description or drawings together with a different term that is broader or the same in meaning can also be replaced by the different term in any place in the description or drawings. Further, the operations and the configurations of the nickel manganese cobalt composite hydroxide, the method for producing the nickel manganese cobalt composite hydroxide, the lithium nickel manganese cobalt composite oxide, and the lithium ion secondary battery are not limited to those described in each embodiment and each example of the present invention, but may be carried out in various modifications.

Glossary of Drawing References

S10 Crystallization process
S11 Nucleation process
S12 Particle growth process
S20 Washing process

The invention claimed is:

1. A nickel manganese cobalt composite hydroxide, which is a precursor of a positive electrode active material, and which is composed of secondary particles to which primary particles containing a nickel, a manganese, and a cobalt are aggregated, or composed of the primary particles and the secondary particles, wherein both of sodium content and potassium content contained in the nickel manganese cobalt composite hydroxide are less than 0.0005% by mass, a void ratio of particles of the nickel manganese cobalt composite hydroxide is 20% to 50%, and the nickel manganese cobalt composite hydroxide is represented by a general formula: $Ni_xMn_yCo_zM_t(OH)_{2+a}$ wherein $x+y+z+t=1$, $0.20 \leq x \leq 0.80$, $0.10 \leq y \leq 0.90$, $0.10 \leq z \leq 0.50$, $0 \leq t \leq 0.10$, $0 \leq a \leq 0.5$, and M is at least one selected from Mg, Ca, Al, Ti, V, Cr, Zr, Nb, Mo, and W.

2. The nickel manganese cobalt composite hydroxide according to claim 1, wherein a specific surface area of the nickel manganese cobalt composite hydroxide is 30 to 40 $m^2/g$.

3. The nickel manganese cobalt composite hydroxide according to claim 1, wherein a sulfate content contained in the nickel manganese cobalt composite hydroxide is 0.2% by mass or less, and a chloride content is 0.01% by mass or less.

4. The nickel manganese cobalt composite hydroxide according to claim 1, wherein a value of [(d90–d10)/average particle size], which is an index indicating a spread of a particle size distribution of the nickel manganese cobalt composite hydroxide, is 0.55 or less.

5. The nickel manganese cobalt composite hydroxide according to claim 1, wherein a content of at least one of a calcium and a magnesium contained in the nickel manganese cobalt composite hydroxide is less than 0.0005% by mass.

6. A lithium nickel manganese cobalt composite oxide composed of secondary particles to which primary particles containing a lithium, a nickel, a manganese, and a cobalt are aggregated, or composed of the primary particles and the secondary particles, wherein both of a sodium content and potassium content contained in the lithium nickel manganese cobalt composite oxide are less than 0.0005% by mass, a void ratio of the lithium nickel manganese cobalt composite oxide is 20% to 50%, and a specific surface area of the lithium nickel manganese cobalt composite oxide is 30 to 40 $m^2/g$.

7. The lithium nickel manganese cobalt composite oxide according to claim 6, wherein a sulfate content contained in the lithium nickel manganese cobalt composite oxide is 0.15% by mass or less, a chloride content is 0.005% by mass or less, and a Me site occupancy factor is 93.0% or more.

8. The lithium nickel manganese cobalt composite oxide according to claim 6, wherein a ratio of an average particle size of the lithium nickel manganese cobalt composite oxide divided by an average particle size of a nickel manganese cobalt composite hydroxide, which is a precursor, is 0.95 to 1.05.

9. The lithium nickel manganese cobalt composite oxide according to claim 6, wherein, when observing 100 or more particles of the lithium nickel manganese cobalt composite oxide selected randomly by a scanning electron microscope, a number that an aggregation of secondary particles is observed is 5% or less with respect to a total number of observed secondary particles.

10. The lithium nickel manganese cobalt composite oxide according to claim 6, wherein a content of at least one of a calcium and a magnesium contained in the lithium nickel manganese cobalt composite oxide is less than 0.0005% by mass.

11. A lithium ion secondary battery comprising a positive electrode at least containing the lithium nickel manganese cobalt composite oxide according to claim 6.

* * * * *